US008637621B2

(12) United States Patent
Iwata et al.

(10) Patent No.: US 8,637,621 B2
(45) Date of Patent: Jan. 28, 2014

(54) LONG-WEARABLE SOFT CONTACT LENS

(75) Inventors: Junichi Iwata, Nobeoka (JP); Tsuneo Hoki, Nobeoka (JP); Seiichirou Ikawa, Nobeoka (JP)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 12/960,236

(22) Filed: Dec. 3, 2010

(65) Prior Publication Data

US 2011/0211158 A1 Sep. 1, 2011

Related U.S. Application Data

(60) Continuation of application No. 11/437,732, filed on May 22, 2006, now abandoned, which is a continuation of application No. 10/804,161, filed on Mar. 19, 2004, now abandoned, which is a division of application No. 09/737,809, filed on Dec. 18, 2000, now Pat. No. 6,867,245.

(30) Foreign Application Priority Data

Dec. 16, 1999 (JP) .................................... 11-357376
Dec. 17, 1999 (JP) .................................... 11-358699

(51) Int. Cl.
C08F 30/08 (2006.01)

(52) U.S. Cl.
USPC .......................................... 526/279; 523/107

(58) Field of Classification Search
USPC .......................................... 523/107; 526/279
See application file for complete search history.

(56) References Cited

U.S. PATENT DOCUMENTS

| 4,062,627 | A | 12/1977 | Wajs et al. |
| 4,121,896 | A | 10/1978 | Shepherd |
| 4,136,250 | A | 1/1979 | Mueller et al. |
| 4,153,596 | A | 5/1979 | Oertel et al. |
| 4,208,365 | A | 6/1980 | LeFevre |
| 4,259,467 | A | 3/1981 | Keogh et al. |
| 4,260,725 | A | 4/1981 | Keogh et al. |
| 4,440,918 | A | 4/1984 | Rice et al. |
| 4,605,712 | A | 8/1986 | Mueller et al. |
| 4,703,097 | A | 10/1987 | Wingler et al. |
| 4,711,943 | A | 12/1987 | Harvey, III |
| 4,786,444 | A | 11/1988 | Hwang |
| 4,879,072 | A | 11/1989 | Bourset et al. |
| 4,954,586 | A | 9/1990 | Toyoshima et al. |
| 5,023,305 | A | 6/1991 | Onozuka et al. |
| 5,070,169 | A | 12/1991 | Robertson et al. |
| 5,158,717 | A | 10/1992 | Lai |
| 5,264,465 | A | 11/1993 | Futamura et al. |
| 5,274,008 | A | 12/1993 | Lai |
| 5,312,690 | A | 5/1994 | Fukuda et al. |
| 5,321,108 | A | 6/1994 | Kunzler et al. |
| 5,346,946 | A | 9/1994 | Yokoyama et al. |
| 5,352,714 | A | 10/1994 | Lai et al. |
| 5,358,995 | A | 10/1994 | Lai et al. |
| 5,387,632 | A | 2/1995 | Lai et al. |
| 5,486,579 | A | 1/1996 | Lai et al. |
| 5,760,100 | A | 6/1998 | Nicolson et al. |
| 5,807,944 | A | 9/1998 | Hirt et al. |
| 5,945,498 | A | 8/1999 | Hopken et al. |
| 6,158,861 | A | 12/2000 | Oyama et al. |
| 6,310,116 | B1 | 10/2001 | Yasuda et al. |
| 6,315,929 | B1 | 11/2001 | Ishihara et al. |
| 6,867,245 | B2 | 3/2005 | Iwata et al. |

FOREIGN PATENT DOCUMENTS

| EP | 0330616 | B1 | 6/1991 |
| EP | 0330617 | B1 | 7/1991 |
| EP | 0584826 | A2 | 3/1994 |
| EP | 0908744 | A1 | 4/1999 |
| EP | 0942311 | A1 | 9/1999 |
| GB | 1399301 | | 7/1975 |
| JP | 54081363 | | 6/1979 |
| JP | 60-3342 | B2 | 1/1985 |
| JP | 63297411 | | 12/1988 |
| JP | 05-019214 | | 1/1993 |
| JP | 06-106552 | | 4/1994 |
| JP | 6170857 | A | 6/1994 |
| JP | 7-266443 | | 10/1995 |
| JP | 8-25378 | A | 1/1996 |
| JP | 2503028 | B2 | 6/1996 |
| JP | 08-227001 | | 9/1996 |
| JP | 08-245737 | | 9/1996 |
| JP | 8245790 | | 9/1996 |
| JP | 8304746 | | 11/1996 |
| JP | 11-320571 | | 11/1999 |
| JP | 11-320699 | | 11/1999 |
| WO | 92/09421 | A2 | 6/1992 |
| WO | 93/09155 | A1 | 5/1993 |
| WO | 9631792 | A1 | 10/1996 |

OTHER PUBLICATIONS

Declaration of Eri Ito dated Mar. 30, 2010 (4 pages).
Suminoe et al., "Study of new non-water containing soft contact lenses, First Report: Basic physical properties of the material (1)," Journal of Japan Contact Lens Society, vol. 25, 1983 (in Japanese with English translation attached) (18 pages).
Website page from Bausch & Lomb, "Bausch & Lomb PureVision (TM) Contact Lenses," www.bausch.com/VisionCare/pages/PureVision/purevision, Apr. 21, 1999 (1 page).
"Ciba promotes merits of new 30-night lens," Optician, vol. 218, No. 5726, Nov. 5, 1999, p. 5 (1 page).
Communication of a notice of opposition issued by the European Patent Office in corresponding European Patent Application No. 00981765 dated Jun. 2, 2010.
Encyclopedia of Polymer Science and Engineering, vol. 12, John Wiley & Sons, 1988, pp. 193-200, 217, and 225-229.
Lai et al., Control of Properties in Silicon Hydrogels by Using a Pair of Hydrophilic Monomers, Journal of Applied Polymer Science, (1996), vol. 61, 2051-2058 (1996).
Declaration by Eri Ito of Mencon dated Oct. 15, 2012 (4 pages).
Declaration by Eri Ito of Menicon dated Sep. 30, 2012 concerning JP08-227001A (4 pages).
Declaration by Eri Ito of Menicon dated Sep. 30, 2012 concerning EP0584826B1 (5 pages).
Letter from Withers & Rogers LLP to EPO dated Nov. 26, 2012 regarding EP 1 243 960 B1 (8 pages).

Primary Examiner — Kuo-Liang Peng
(74) Attorney, Agent, or Firm — Kilyk & Bowersox, P.L.L.C.

(57) ABSTRACT

A hydrogel soft contact lens which is superior in extended-wearability, lens movement, wear comfort, and which does not adhere to a cornea when worn is provided. The lens provided can be a silicone hydrogel contact lens which contains units of hydrophilic siloxane monomers and amide-group-containing monomers having an N-vinyl group.

20 Claims, No Drawings

LONG-WEARABLE SOFT CONTACT LENS

CROSS REFERENCE TO RELATED APPLICATIONS

This application is a continuation of U.S. patent application Ser. No. 11/437,732, filed May 22, 2006 (abandoned), which in turn is a continuation of prior U.S. patent application Ser. No. 10/804,161, filed Mar. 19, 2004 (abandoned), which in turn is a divisional application of U.S. patent application Ser. No. 09/737,809, filed Dec. 18, 2000 (now U.S. Pat. No. 6,867,245), which claims priority under 35 U.S.C. §119 from Japanese Patent Application No. 11-357376, filed Dec. 16, 1999, and from Japanese Patent Application No. 11-358699, filed Dec. 17, 1999, and are incorporated in their entirety by reference herein.

TECHNICAL FIELD

The present invention relates to a soft contact lens superior in long-wearability (extended-wearability). More precisely, the present invention relates to a hydrogel soft contact lens having no adhesion to a cornea in wearing and superiorities in lens movement, comfort in wearing and extended-wearability.

The present invention further relates to an ophthalmologic lens material comprising a hydrophilic polysiloxane copolymer. The present invention still further relates to a hydrophilic copolymer superior in water wettability, oxygen permeability, deposition resistance, flexibility, optical transparency and strength useful as a soft contact lens.

BACKGROUND ART

Polysiloxane compounds, such as dimethylsilicone compounds as typical examples, have conventionally been widely used industrially by themselves or as modifiers for other materials utilizing specific functions such as heat resistance, electrical insulation, flexibility, lubrication and water repellency. For example, polydimethylsiloxane with methacrylic groups at both ends, which is a polymerizable polysiloxane, has been used as a polymer modifier for acrylic polymers or polystyrene, utilizing the polymerization function. Polysiloxanes are used as gas permselective membranes due to high gas permeability and also as biomaterials or medical materials due to little influence on a human body. There are many studies and patent applications on an application to a contact lens utilizing their superior oxygen permeability, flexibility and optical transparency (for example, JP-B-63-29741 and JP Nos. 1430546, 2532406 and 2716181).

Contact lenses are fundamentally classified into a soft and a hard types. Hard contact lenses are literally hard and show an discomfort in wearing. However, a recent remarkable improvement in oxygen permeability has produced products for a continuous wearing. On the other hand, soft contact lenses have features in softness and comfortable in wearing but still have many problems. Soft contact lenses are classified, in detail, to a hydrogel and a non-hydrofel types.

Hydrogel soft contact lenses are composed of copolymers of hydrophilic monomers such as hydroxyethyl methacrylate and N-vinylpyrrolidone as a main component and prepared by lathe-cutting, molding or cast molding methods, followed by a swelling treatment in a physiological saline solution to obtain a lens with water content of about 40-80%.

Non-hydrogel soft contact lenses include, for example, a silicone rubber lens obtained by thermal curing of a mixture of polydimethylsiloxane capped with vinyldimethylsilyl groups at both ends of its molecular chain and methylhydrogenpolysiloxane by molding method after an addition of a platinum-based catalyst, and a flexible lens with an elastic modulus between soft and hard types, composed of polyperfluoroether as a main component, linked with polymerizable groups such as methacrylic groups at both ends (JP Nos. 1278540 and 1677573). Another example for manufacturing a non-hydrogel soft contact lens with comfortable in wearing is preparing a lens by lathe-cutting a hard substrate obtained by a copolymerization of (meth)acrylic acid and (meth)acrylate followed by an esterification and/or a transesterification treatment (JP No. 952157).

There are many inconveniences in handling a hydrous soft contact lens such as poor oxygen permeability, liability to fracture, inferior durability and periodical boiling sterilization required due to an easy deposition of tear components and a possibility of germ growth. Soft contact lens of a higher water content has improved oxygen permeability to a certain extent but is not sufficient enough, and does not have a satisfactory strength for a extended-wearable lens.

On the other hand, a non-hydrogel soft contact lens also has the following problems. Silicone lens, started with a big expectation due to extremely high oxygen permeability, has poor wettability to tear owing to a hydrophobic lens surface. Although surface treatments to improve hydrophilic property such as plasma processing and grafting hydrophilic monomers have been tried but sufficient levels of hydrophilic property and durability have not been obtained. Another problem is an adhesion during wearing and deposition with proteins and lipids in tear. In order to overcome these problems, a hydrogel soft contact lens consisting of silicone hydrogel with high oxygen permeability has been proposed, but it is still insufficient in surface wettability, liable to lipid staining and thus inferior as an extended-wearable lens (for example, Japanese Patent No. 1421481, JP-A-6-503276, JP-A-7-505169, JP-A-7-508063 and JP-A-8-245737).

DISCLOSURE OF THE INVENTION

After through studies on characteristics of the materials for a soft contact lens to solve the above mentioned problems, the inventors could accomplish the present invention by finding out that the objectives could be attained by giving specific characteristics to a lens material.

The inventors found out that copolymers of hydrophilic siloxane monomers with amide-group-containing monomers having N-vinyl group were very useful to solve the above mentioned problems, and that contact lenses obtained in a specific polar mold were, in particular, useful to solve the above mentioned problems, and thus attained the present invention.

The present invention includes the following disclosures.

1. A hydrogel soft contact lens with contact angle of a surface in a range of 10-50° and 30-90° by the captive bubble method in water and the sessile drop method in air, respectively, oxygen permeability of not less than 30 and water content of not less than 5%.

2. A hydrogel soft contact lens with a surface contact angle in a range of 10-40° and 30-80° by the captive bubble method in water and the sessile drop method in air, respectively, oxygen permeability of not less than 80 and water content of not less than 9%.

3. The hydrogel soft contact lens according to the above 1st item or the 2nd item, comprising a copolymer obtained by a polymerization of at least one kind of hydrophilic siloxane monomer.

4. The hydrogel soft contact lens according to the above 3rd item, wherein the hydrophilic siloxane monomer is a hydrophilic polysiloxane monomer shown by the following formula (1):

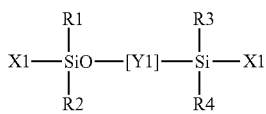
(1)

wherein, X1 is a polymerizable substitutent shown by the following formula (2):

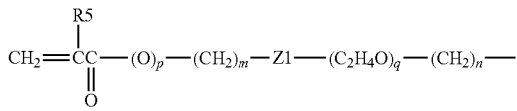
(2)

wherein, R5 is a hydrogen or a methyl group; Z1 is a linking group selected from —NHCOO—, —NHCONH—, —OCONH—R6-NHCOO—, —NHCONH—R7-NHCONH— and —OCONH—R8-NHCONH—(R6, R7 and R8 are hydrocarbon groups with 2-13 carbon atoms); m is 0-10; n is 3-10; p is 0 when m is 0 and 1 when m is not less than 1; q is an integer of 0-20; R1, R2, R3 and R4 are groups selected from hydrocarbon groups with 1-12 carbon atoms or trimethylsiloxy group, respectively; and the structure [Y1] shows a polysiloxane backbone comprising not less than 2 siloxane linkages.

5. The hydrogel soft contact lens according to the above 4th item, wherein the structure [Y1] is a structural unit shown by the following formula (1):

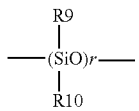
(3)

wherein, R9 and R10 are groups selected from hydrocarbon groups with 1-12 carbon atoms, hydrocarbon groups substituted with fluorine atom(s), trimethylsiloxy group and hydrophilic substituents, and may be different from each other in the chain, and r is 7-1000.

6. The hydrogel soft contact lens according to the above 5th item, wherein the structural unit [Y1] according to the above 5th item is a polysiloxane monomer with R9 and R10 being methyl group.

7. The hydrogel soft contact lens according to the above 4th item consisting of a hydrophilic polysiloxane monomer, wherein the structural unit [Y1] according to the above 4th item comprises linked structural units (Ia) and (IIa) shown below, the linking ratio of the units (Ia) and (IIa) being 1:10-10:1, and the total number of the linking of (Ia) and (IIa) being 7-1000:

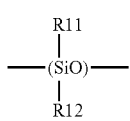
(Ia)

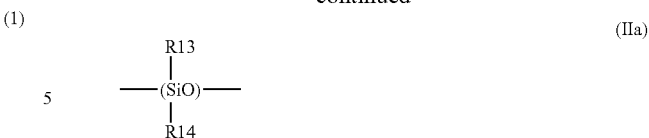
(IIa)

wherein, each of R11 and R12 is a hydrocarbon group with 1-12 carbon atoms, respectively, each of R13 and R14 is a hydrocarbon group with 1-12 carbon atoms or a hydrocarbon group substituted with fluorine atom(s), respectively, and at least one of R13 and R14 is a hydrocarbon group substituted with fluorine atom(s).

8. The hydrogel soft contact lens according to the above 7th item consisting of a hydrophilic polysiloxane monomer, wherein R11, R12 and R13 are methyl groups and R14 is a trifluoropropyl group in the structural unit [Y1] according to the above 7th item.

9. The hydrogel soft contact lens according to the above 4th item consisting of a hydrophilic polysiloxane monomer, wherein the structural unit [Y1] according to the above 4th item comprises linked structural units (Ib) and (IIb) shown below, the linking ratio of the structural units (Ib) and (IIb) being (Ib)/(IIb)=0.1-200, and the total number of the linking of (Ib) and (IIb) being 7-1000:

(Ib)

(IIb)

wherein, R15 and R16 are a group selected from hydrocarbon group with 1-12 carbon atoms, hydrocarbon group with 1-12 carbon atoms substituted with fluorine atom(s) and trimethylsiloxy group, respectively, and they may be the same or different from each other; each of R17 and R18 is a group consisting of hydrocarbon group with 1-12 carbon atoms, trimethylsiloxy group or hydrophilic groups, respectively; and at least one of R17 and R18 groups is a hydrophilic group, wherein the hydrophilic group is a linear or cyclic hydrocarbon group linked with at least one substituent selected from hydroxy group and polyoxyalkylene group.

10. The hydrogel soft contact lens according to the above 4th item consisting of a hydrophilic polysiloxane monomer, wherein the structural unit [Y1] according to the above 4th item comprises linked structural units (Ic), (IIc) and (IIIc) shown by the following formulas:

(Ic)

-continued

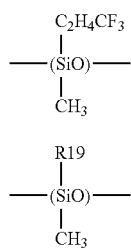
(IIc)

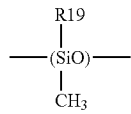
(IIIc)

wherein, R19 is a hydrophilic substituent which is a linear or cyclic hydrocarbon group linked with at least one substituent selected from hydroxy group and polyoxyalkylene group; the linking ratio of the structural units (Ic), (IIc) and (IIIc) being ((Ic)+(IIc))/(IIIc)=0.5-100, (IIc)/(Ic)=0-1, and the total number of the linking of (Ic), (IIc) and (IIIc) being 7-1000.

11. The hydrogel soft contact lens according to the above 10th item, wherein the linking ratio of the structural units (Ic), (IIc) and (IIIc) in the structural unit [Y1] according to the above $10^{th}$ item is ((Ic)+(IIc))/(IIIc)=1-50, (IIc)/(Ic)=0.01-0.50, and the total number of the linking of (Ic), (IIc) and (IIIc) is 20-500.

12. The hydrogel soft contact lens according to any one of the above $9^{th}$-$11^{th}$ items consisting of a hydrophilic polysiloxane monomer, wherein the hydrophilic substituent is shown by the following formula (4) or (5):

—R20(OH)$a$      (4)

wherein, R20 is a hydrocarbon group with 3-12 carbon atoms; the group may have a group of —O—, —CO— or —COO— inserted between carbon atoms; only one OH group can be substituted on one carbon atom; and a is a number not less than 1:

—R21-(OR22)$b$—OZ2      (5)

wherein, R21 is a hydrocarbon group with 3-12 carbon atoms; the group may have a group of —O—, —CO— or —COO— inserted between carbon atoms; R22 is a hydrocarbon group with 2-4 carbon atoms, and the number of the carbon atoms may be different from each other when b is not less than 2; b is 1-200; Z2 is a group selected from hydrogen atom, hydrocarbon group with 1-12 carbon atoms and —OCOR23 (R23 is a hydrocarbon group with 1-12 carbon atoms).

13. The hydrogel soft contact lens according to any one of the above $9^{th}$-$11^{th}$ items, wherein the hydrophilic substituent is selected from the group consisting of the following formulas (6), (7) and (8):

—C$_3$H$_6$OH      (6)

—C$_3$H$_6$OCH$_2$CH(OH)CH$_2$OH      (7)

—C$_3$H$_6$OC$_2$H$_4$OH      (8)

14. The hydrogel soft contact lens according to the above $9^{th}$-$11^{th}$ items, wherein the hydrophilic substituent is selected from the group of the following formulas (9) and (10):

—C$_3$H$_6$(OC$_2$H$_4$)$_c$OH      (8)

—C$_3$H$_6$(OC$_2$H$_4$)$_d$OCH$_3$      (10)

wherein, c and d are 1-40.

15. The hydrogel soft contact lens according to the above $4^{th}$ item, wherein the structural unit [Y1] in the hydrophilic polysiloxane monomer shown by the formula (1) according to the above $4^{th}$ item is expressed by the following formula (11):

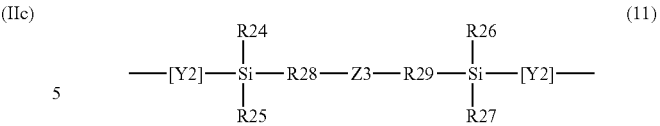
(11)

wherein, Z3 is a linking group shown by the following formula (12):

-A-COHN—R30-NHCOO—R31-CONH—R30-NHCO-A-      (12)

wherein, R30 is a hydrocarbon group with 4-20 carbon atoms and may be interrupted by oxygen atom; R31 is polyoxyalkylene group or fluorine-substituted polyoxyalkylene group; the structural unit [Y2] means a polysiloxane structural unit shown by any one of formulas (3), linked structure of (Ia) and (IIa), linked structure of (Ib) and (IIb) or linked structure of (Ic), (IIc) and (IIIc); a means —O— or —NH— linkage; each of R24, R25, R26 and R27 is a group selected from hydrocarbon group with 1-12 carbon atoms and trimethylsiloxy group, respectively; each of R28 and R29 is a hydrocarbon group with 3-12 carbon atoms and may be interrupted by oxygen atom, respectively.

16. The hydrogel soft contact lens according to the above $15^{th}$ item consisting of a polymer from a hydrophilic polysiloxane monomer, wherein R30 in the Z3 liking group shown by the formula (11) according to the above $15^{th}$ item is selected from hexamethylene, tetramethylene, dicyclohexylmethane, hydrogenated xylylene and isophorone groups and R31 is selected from polyethylene glycol, polypropylene glycol and polybutylene glycol.

17. The hydrogel soft contact lens according to any one of the above $4^{th}$-$14^{th}$ item, wherein the polymerizable Z1 liking group shown by the formula (2) according to the above $4^{th}$ item is shown by the following formula (13):

—B—COHN—R32-NHCOO—R33-CONH—R32-NHCO—B—      (13)

wherein, R32 is a hydrocarbon group with 4-20 carbon atoms and may be interrupted by oxygen atom; R33 is polyoxyalkylene or polyoxyfluoloalkylene group; B means —O— or —NH— linkage.

18. The hydrogel soft contact lens according to the above $17^{th}$ item consisting of a polymer from a hydrophilic polysiloxane monomer, wherein R32 in the formula (13) is selected from hexamethylene, tetramethylene, dicyclohexylmethane, hydrogenated xylylene and isophorone groups and R33 is selected from polyethylene glycol, polypropylene glycol and polybutylene glycol.

19. A hydrogel soft contact lens obtained by a copolymerization of at least 1 kind of hydrophilic polysiloxane monomer in the formula (1) with at least 1 kind of hydrophilic monomer.

20. The hydrogel soft contact lens according to the above 19th item, wherein the hydrophilic monomer is an amide monomer.

21. The hydrogel soft contact lens according to the above 19th item, wherein the hydrophilic monomer is an amide monomer containing N-vinyl group.

22. The hydrogel soft contact lens according to the above 21st item, wherein the amide monomer containing N-vinyl group is selected from N-vinyl formamide, N-vinyl acetamide, N-vinyl isopropylamide, N-vinyl-N-methylacetamide, N-vinylpyrrolidone and N-vinyl caprolactam.

23. The hydrogel soft contact lens according to the above 21st item, wherein the amide monomer containing N-vinyl group is N-vinyl N-methylacetamide or N-vinylpyrrolidone.

24. The hydrogel soft contact lens according to any one of the above 21st-23rd items, consisting of a copolymer composed of 10-99% by weight of a hydrophilic polysiloxane monomer and 1-80% by weight of an amide monomer containing N-vinyl group.

25. The hydrogel soft contact lens according to any one of the above 21st-23rd items, consisting of a copolymer composed of 30-95% by weight of a hydrophilic polysiloxane monomer and 5-60% by weight of a monomer containing an amide group with N-vinyl group.

26. The hydrogel soft contact lens according to any one of the above 3rd-25th items, obtained by a polymerization of a crosslinkable monomer linked with urethane groups.

27. The hydrogel soft contact lens according to the above 26th item, wherein the crosslinkable monomer is shown by the following formula (14):

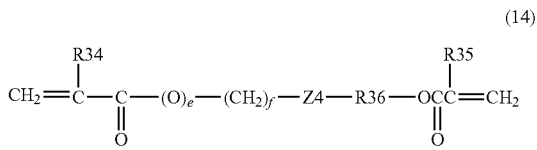

(14)

wherein, R34 and R35 are hydrogen or methyl group and may be the same or different from each other; Z4 is —NHCOO— linking group; R36 is selected from hydrocarbon groups with 2-10 carbon atoms or polyoxyethylene group shown by —$(C_2H_4O)_g C_2H_4$— (g is 2-40); f is 0-10; e is 0 when f is o and 1 when f is not less than 1.

28. The hydrogel soft contact lens according to the above 26th item, wherein the crosslinkable monomer is shown by the following formula (15):

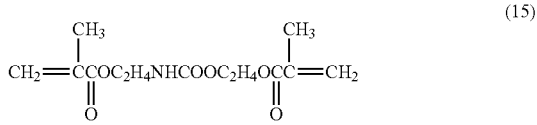

(15)

29. The hydrogel soft contact lens according to any one of the 19th-28th items, wherein surface contact angel is in a range of 10-50° and 30-90° by the captive bubble method in water and by the sessile drop method in air, respectively, oxygen permeability is not less than 30 and water content is not less than 5%.

30. The hydrogel soft contact lens according to the above 29th item, wherein surface contact angle is in a range of 10-40° and 30-80° by captive bubble method in water and by sessile drop method in air, respectively, oxygen permeability is not less than 80 and water content is not less than 9%.

31. The hydrogel soft contact lens according to any one of the above 1st-30th items, manufactured by a polymerization in a mold.

32. The hydrogel soft contact lens according to the above 3rd item, wherein the hydrophilic siloxanyl monomer is shown by the following formula (16):

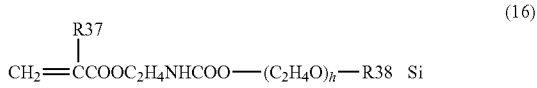

(16)

wherein, R37 is hydrogen or methyl group; R38 is siloxanyl alkyl group; and h is 0-20.

33. The hydrogel soft contact lens according to the above 3rd item, consisting of a polymer comprising at least the hydrophilic siloxanyl monomer shown by the following above (16), a hydrophilic monomer and a crosslinkable monomer.

34. The hydrogel soft contact lens according to any of the above 32nd or 33rd item, wherein the hydrophilic siloxanyl monomer according to the above 32nd item is shown by the following formula (17):

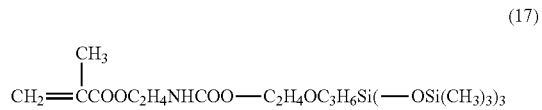

(17)

35. The hydrogel soft contact lens according to any one of the above 32nd-34th items, consisting of a polymer comprising at least a hydrophilic siloxanyl monomer shown by the above formula (16), a siloxanyl monomer shown by the following formula (18), a hydrophilic monomer and a crosslinkable monomer:

(18)

wherein, R39 is hydrogen or methyl group; R40 is siloxanyl alkyl group; and j is 0-4.

36. The hydrogel soft contact lens according to the above 35th item, wherein the siloxanyl monomer shown by the formula (18) is tris(trimethylsiloxy)silylpropyl methacrylate.

37. The hydrogel soft contact lens according to any of the above 33rd or 35th item, wherein the hydrophilic monomer is an amide monomer containing N-vinyl group.

38. The hydrogel soft contact lens according to the above 37th item, wherein the amide monomer containing N-vinyl group is N-vinyl-N-methylacetamide or N-vinyl pyrrolidone.

39. The hydrogel soft contact lens according to any one of the above 32nd-38th items, prepared by processing a polymer comprising a hydrophilic siloxanyl monomer by lathe-cutting and polishing method followed by swelling with water.

40. A hydrogel soft contact lens manufactured by a polymerization in a mold, wherein a mold material is insoluble to a composition of polymerizable monomers and at least one side of the mold for forming a lens surface has a polar group.

41. The hydrogel soft contact lens according to the above 40th item, wherein the mold material consists of a resin with a contact angle to water of not higher than 90° by the sessile drop method.

42. The hydrogel soft contact lens according to the above 40th item, wherein the mold material consists of a resin with a contact angel to water is 65-80° by the sessile drop method.

43. The hydrogel soft contact lens according to any one of the above 40th-42nd items, wherein the mold consists of a resin selected from polyamide, polyethylene terephthalate and ethylene-vinylalcohol copolymer.

44. The hydrogel soft contact lens according to any one of the above 40th-42nd items, wherein the mold material consists of ethylene-vinylalcohol copolymer.

45. The hydrogel soft contact lens according to any one of the above 40th-44th items, wherein contact angle of a surface is in a range of 10-50° and 30-90° by the captive bubble method in water and by the sessile drop method in air, respectively, and water content is not less than 5%.

46. The hydrogel soft contact lens according to any one of the above 40th-44th items, wherein surface contact angle is in a range of 10-40° and 30-80° by the captive bubble method in water and by the sessile drop method in air, respectively, and water content is not less than 9%.

47. The hydrogel soft contact lens according to any one of the above 1st-38th items, manufactured by a polymerization in a mold according to any one of the above 40th-44th items.

48. A method for manufacturing a contact lens according to any one of the above 1st-38th items, wherein the method is a polymerization in a mold.

49. A method for manufacturing a contact lens, wherein the mold according to the above 48th item consists of the material according to any one of the above 40th-44th items.

BEST MODE FOR CARRYING OUT THE INVENTION

The present invention provides a hydrogel soft contact lens with contact angle of lens surface within a range of 10-50° and 30-90° by the captive bubble method in water and the sessile drop method in air, respectively, oxygen permeability not less than 30 and water content not less than 5%, and further a hydrogel soft contact lens with contact angle of lens surface within 10-40°, preferably 10-30°, and more preferably 15-30° by the captive bubble method in water, and 30-80°, preferably 40-70° by the sessile drop method in air, oxygen permeability not less than 80, preferably not less than 100, and water content not less than 9%.

The present invention, in particular, includes the following.

(1) A hydrogel soft contact lens with contact angle of lens surface in a range of 10-50° and 40-70° by the captive bubble method in water and the sessile drop method in air, respectively, oxygen permeability not less than 30 and water content not less than 9%.

(2) The hydrogel soft contact lens according to the above mentioned (1), wherein contact angle of surface in a range of 10-30° and 50-65° by the captive bubble method in water and the sessile drop method in air, respectively, oxygen permeability not less than 100 and water content not less than 15%.

(3) The hydrogel soft contact lens according to the above mentioned (1) or (2), consisting of a polymer comprising at least hydrophilic siloxanyl methacrylate shown by the general formula I, and having tensile modulus of $0.8-2\times10^7$ dyne/cm$^2$:

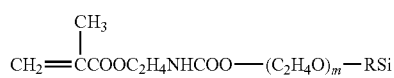

(I)

wherein, m is an integer of 0-4; and RSi is siloxanyl group.

(4) The hydrogel soft contact lens according to any of the above mentioned (1)-(3), consisting of a polymer comprising at least hydrophilic siloxanyl methacrylate shown by the general formula I, hydrophilic monomer and crosslinkable monomer.

(5) The hydrogel soft contact lens according to the above mentioned (3) or (4), wherein the hydrophilic siloxanyl methacrylate is shown by the following formula I1:

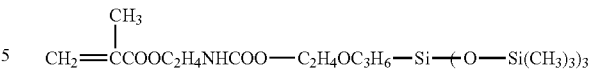

(I1)

(6) The hydrogel soft contact lens according to any of the above mentioned (1)-(5), consisting of a polymer comprising at least hydrophilic siloxanyl methacrylate shown by the general formula I, siloxanyl methacrylate shown by the general formula I2, hydrophilic monomer and a crosslinkable monomer:

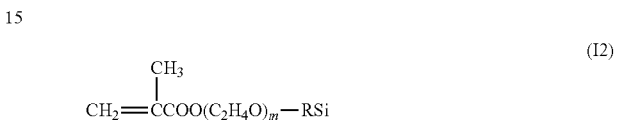

(I2)

wherein, m is an integer of 0-4; and RSi is siloxanyl group.

(7) The hydrogel soft contact lens according to any of the above mentioned (1)-(6), consisting of a polymer comprising at least 5-20% by weight of hydrophilic siloxanyl methacrylate shown by the general formula I1, 15-30% by weight of tris(trimethylsiloxy)silylpropyl methacrylate, 25-35% by weight of N-vinylpyrrolidone, 20-30% by weight of N-dimethylacrylamide, 5-10% by weight of trifluoroethyl methacrylate, 5-10% by weight of 1,1,2,2-tetraethoxy-2-hydroxypropyl methacrylate and 0.2-2% by weight of ethylene glycol dimethacrylate.

(8) The hydrogel soft contact lens according to any of the above mentioned (1)-(7), prepared by processing a polymer comprising hydrophilic siloxanyl methacrylate to lens shape by a lathe-cutting and polishing method and hydration.

(9) The hydrogel soft contact lens according to any of the above mentioned (1)-(6), consisting of a polymer comprising a hydrophilic polysiloxane monomer shown by the following general formula II, a hydrophilic monomer and a crosslinkable monomer:

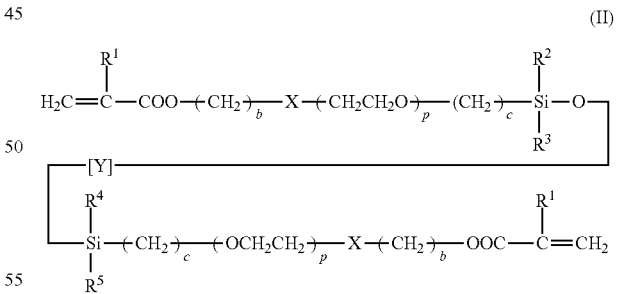

(II)

Wherein, $R^2$ is hydrogen or methyl group; each of $R^2$, $R^3$, $R^4$ and $R^5$ is hydrocarbon group with 1-12 carbon atoms or trimethylsiloxy group; Y consists of the structural units (I') and (II') shown below, ratio of the structural unit (I') and the structural unit (II') being 1:10-10:1 and total number of the structural units (I') and (II') being 7-200; b and c are integers of 1-20, being the same or different from each other; p is an integer of 0-20; X is —NHCOO— group or —OOCNH—$R^{10}$—NHCOO— group ($R^{10}$ is hydrocarbon group with 4-13 carbon atoms):

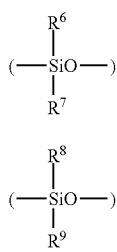

(I')

(II')

wherein, each of $R^6$ and $R^7$ is hydrocarbon group with 1-12 carbon atoms; each of $R^8$ and $R^9$ is hydrocarbon group with 1-12 carbon atoms or fluorine-substituted hydrocarbon group; and at least one of $R^8$ and $R^9$ is fluorine-substituted hydrocarbon group.

(10) The hydrous soft contact lens according to the above mentioned (9), prepared by a polymerization of a polymerizable composition comprising a hydrophilic polysiloxane monomer shown in the general formula II in a mold having polar groups on its surface to a lens shape, followed by hydration.

DETAILED DESCRIPTION OF THE PRESENT INVENTION

Now the above mentioned invention will be explained in detail.

The present invention provides a hydrogel soft contact lens with contact angle of lens surface in a range of 10-50° and 30-90° by the captive bubble method in water and the sessile drop method in air, respectively, oxygen permeability not less than 30 and water content not less than 5%.

By controlling lens surface characteristics, it became possible to provide a contact lens which can exhibit superior water wettability of lens surface for a long wearing period, high oxygen permeability, reduced protein and lipid depositions, stable lens movement, and little adhesion to a cornea. Preferably, a soft contact lens enabling continuous wearing for 30 days can be realized by keeping the contact angle of lens surface in a range of 10-40°, more preferably 10-30°, still more preferably 15-30° by the captive bubble method in water, and also 30-80°, more preferably 40-70° by the sessile drop method in air, oxygen permeability not less than 80, more preferably not less than 100, and water content not less than 9%.

Surface contact angle of a contact lens of the present invention exceeding 50° by the captive bubble method in water often causes staining on a lens surface with lipid and thus not desirable. Although smaller contact angle is desirable, materials with contact angle less than 10° are not suitable due to an easy taking up of proteins of low molecular weight into lens inside and inferior physical properties such as tensile strength generally observed in such materials. On the contrary, contact angle higher than 90° by the sessile drop method in air is also undesirable due to generation of cloudiness during wearing, easy adhesion to a cornea caused by extremely increased lipid staining and deformation of a lens.

Furthermore, a lower limit of contact angle by the sessile drop method of the material is, in general, preferably 30° because of superior physical properties such as tensile strength. Oxygen permeability lower than 30 is not desirable because of an increased load to a cornea making extended-wearing difficult. Water content lower than 5% is not desirable because of significant increase in staining of a lens surface with proteins and lipids and extremely increased adhesion to a cornea.

There is no limitation in a composition of the contact lens of the present invention so long as the lens has characteristics described above. However, a soft contact lens obtained from a polymer containing a hydrophilic siloxanyl methacrylate shown by the above mentioned formula I is preferable.

Use of the hydrophilic siloxanyl methacrylate enabled to provide a contact lens with high oxygen permeability, less depositions of proteins and lipids, superior water wettability at lens surface maintained during an extended-wearing period, stabilized lens movement and less adhesion to a cornea.

In the general formula I, RSi is a siloxanyl group, and at least one kind of group selected from the groups shown by the following formula (1a), (2a) and (3a) may be used:

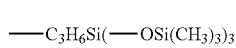 (1a)

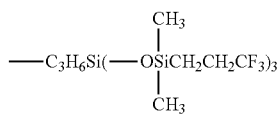 (2a)

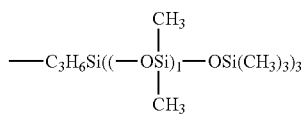 (3a)

wherein, l is an integer of 1-10.

In the general formula I, m is an integer of 0-4 and m not less than 5 is undesirable because the monomer becomes too hydrophilic to be compatible with other copolymerizable monomers, giving a cloudiness during polymerization and a difficulty in homogeneous mixing of monomers. In the formula (3a), l is an integer of 1-10 and l not less than 11 is undesirable because of a reduced compatibility with other copolymerizable monomers.

The above described hydrophilic siloxanyl methacrylate is synthesized by reacting 2-isocyanatoethyl methacrylate with siloxanylalkyl alcohol.

The soft contact lens of the present invention consists of a hydrogel polymer with water content of about 5-60%, comprising hydrophilic siloxanyl methacrylate shown by the general formula I, and having oxygen permeability not less than about 30 and tensile modulus $0.8-2\times10^7$ dyne/cm$^2$. The lens provides less adsorption of proteins and lipids to inner part of lens, easy lens care, little decrease in lens movement caused by stain accumulation, superior stability in lens shape, flexible and comfortable, no adhesion to a cornea during wearing caused by sucking disk effect and thus enabling an extended-wearing.

Water content less than 5% is undesirable due to an easy adsorption of lipids to lens, resulting in an adhesion to a cornea. On the contrary, water content over 60% is also undesirable because of giving low strength, poor scratch resistance in handling, easy fracture and high adsorption of proteins. Oxygen permeability lower than 30 is undesirable due to difficulty in continuous wearing and possibility to cause diseases of a cornea by long wearing. Tensile modulus less than $0.8\times10^7$ dyne/cm$^2$ is undesirable due to inferior stability in lens shape, difficulty in handling to wear and poor feeling in wearing together with possible damages to cornea and sclera caused by easy turning back of lens at an edge or waving on an eye surface during wearing. Tensile modulus over 2×10⁷ dyne/cm² is undesirable because of an increased sucking disk effect resulting in a significant decrease in lens movement and occurrence of an adhesion.

Among hydrophilic siloxanyl methacrylates shown by the general formula I, used for a soft contact lens of the present invention, the structure shown by the following formula Id is preferable because of providing a well-balanced performance among water content, oxygen permeability and modulus, together with less deposition of proteins and lipids:

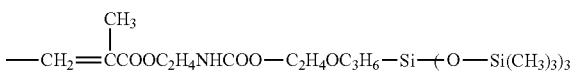

Any polymer can be used for a soft contact lens of the present invention so long as it contains hydrophilic siloxanyl methacrylate described above. For example, the polymer includes copolymers with the following copolymerizable compounds: acrylic monomers such as methyl acrylate, ethyl acrylate and acrylic acid; methacrylic monomers such as methyl methacrylate, ethyl methacrylate, 2-hydroxyethyl methacrylate and methacrylic acid; siloxane monomers such as tris(trimethylsiloxy)silylpropyl methacrylate, bis(trimethylsiloxy)methylsilylpropyl methacrylate, pentamethyldisiloxanepropyl methacrylate, tris(trimethylsiloxy)silylpropyloxyethyl methacrylate, and tris(polydimethylsiloxy)silylpropyl methacrylate; fluorosiloxane monomers such as tris(dimethyltrifluoropropylsiloxy)silylpropyl methacrylate; perfluoroalkyl monomers such as 2,2,2-trifluoroethyl methacrylate, 2,2,3,3,3-pentafluoropropyl methacrylate and hexafluoroisopropyl methacrylate; fluoroalkyl and fluoroalkylether monomers containing hydroxyl group such as 1,1,2,2-tetrafluoroethoxy-2-hydroxypropyl methacrylate; hydrophilic monomers such as N-vinylpyrrolidone, N,N'-dimethylacrylamide and N-vinyl-N-methylacetamide; crosslinkable monomers such as ethylene glycol dimethacrylate, tetraethylene glycol dimethacrylate and tetramethyldisiloxanebis(propylmethacrylate).

Among these, copolymers with siloxane methacrylates, fluoroalkylsiloxane methacrylates, fluoroalkyl methacrylates, fluoroalkylether methacrylates containing hydroxyl groups, hydrophilic monomers, crosslinkable monomers with two or more unsaturated groups within a molecule and siloxane macromers with polymerizable unsaturated groups at molecular ends are preferable because of well-balanced physical properties such as oxygen permeability, stain deposition resistance and mechanical strength. Preferable hydrophilic monomers in the present invention are amide monomers containing N-vinyl group, and N-vinylpyrrolidone or N-vinyl-N-methylacetamide, in particular, can provide a contact lens with superior surface wettability. An example of such contact lens comprises a polymer composed of 5-20% by weight of hydrophilic siloxanyl methacrylate shown by formula I1, 15-30% by weight of tris(trimethylsiloxy)silylpropyl methacrylate, 25-35% by weight of N-vinylpyrrolidone, 20-30% by weight of N-dimethylacetamide, 5-10% by weight of trifluoroethyl methacrylate, 5-10% by weight of 1,1,2,2-tetrafluoroethoxy-2-hydroxypropyl methacrylate and 0.2-2% by weight of ethylene glycol dimethacrylate.

A contact lens of the present invention can be manufactured by conventional lens manufacturing methods. The methods includes, for example, a method by lathe-cutting of polymer bock followed by polishing, a method to cast a monomer composition into a mold with corresponding lens shape followed by polymerization, and a method to form only one face of lens by casting method using a polymerization mold then finish the other face by lathe-cutting and polishing method, etc. A feature of the present invention is that a contact lens can be manufactured by lathe-cutting and polishing method. Use of hydrophilic siloxanyl methacrylate shown by formula I improves a compatibility between siloxanyl monomer to raise oxygen permeability and hydrophilic monomer to enhance water wettability to give a polymer sufficiently hard for machining and polishing in dry state and a hydrous soft contact lens with superior optical transparency when swelled with water and suitable range of modulus. A lens manufactured by lathe-cutting and polishing method is preferable because it has the same polymer composition in surface and inside of a lens, and exhibits a stable lens performances such as water wettability and depositions of proteins and lipids together with little change in surface characteristics during long-wearing.

Also, a polymer comprising hydrophilic polysiloxane monomer shown by the general formula II can be used for a contact lens of the present invention:

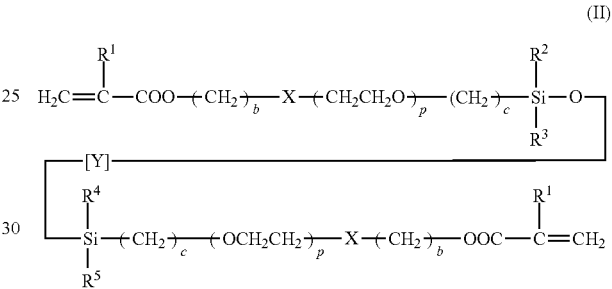

wherein, R¹ is hydrogen or methyl group; each of R², R³, R⁴ and R⁵ is a hydrocarbon group with 1-12 carbon atoms or trimethylsiloxy group; Y consists of the structural units (I') and (II') shown below, ratio of the structural unit (I') and the structural unit (II') being 1:10-10:1 and total number of the structural units (I') and (II') being 7-200; each of b and c is an integer of 1-20, being the same or different from each other; p is an integer of 0-20; X is —NHCOO— group or —OOCNH—R¹⁰—NHCOO— group (R¹⁰ is a hydrocarbon group with 4-13 carbon atoms).

wherein, each of R⁶ and R⁷ is a hydrocarbon group with 1-12 carbon atoms; and each of R⁸ and R⁹ is a hydrocarbon or fluorinated hydrocarbon group with 1-12 carbon atoms, and at least one of R⁸ and R⁹ being fluorinated hydrocarbon group. The above hydrophilic polysiloxane monomer may be copolymerized with the copolymerizable monomers described above. Furthermore, copolymers further comprising polysiloxane monomers with polymerizable unsaturated groups at molecular ends may be used, which are described in JP-B-3-240021, JP-B-3-257420, JP-B-4-50814, JP-B-5-45612, JP No. 2592356, etc., and shown by the following formulas (4a)-(7a):

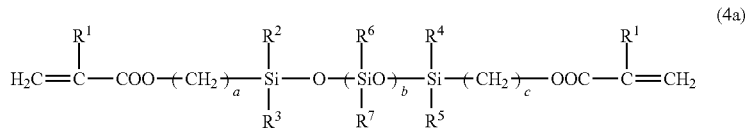

(4a)

wherein, $R^1$ is hydrogen or methyl group; each of $R^2$, $R^3$, $R^6$ and $R^5$ is hydrocarbon group or trimethylsiloxy group; each of $R^6$ and $R^7$ is hydrocarbon group with 1-12 carbon atoms; each of a and c is an integer of 1-20; and b is an integer of 10-100.

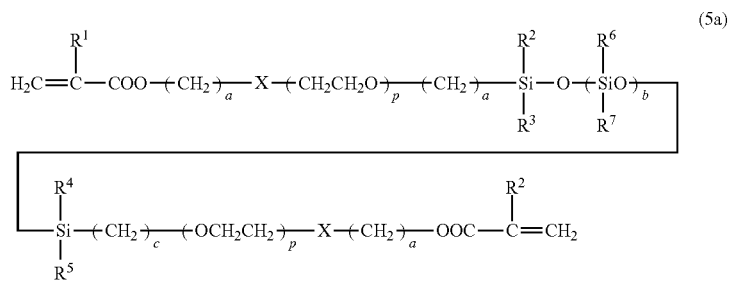

(5a)

wherein, $R^1$ is hydrogen or methyl group; each of $R^2$, $R^3$, $R^4$ and $R^5$ is methyl or trimethylsiloxy group; each of $R^6$ and $R^7$ is a hydrocarbon group with 1-12 carbon atoms; each of a and c is an integer of 1-20; p is an integer of 0-20; b is an integer of 10-100; X is —NHCOO— group or —OOCNH—$R^8$—NHCOO— group ($R^8$ is hydrocarbon group with 4-13 carbon atoms).

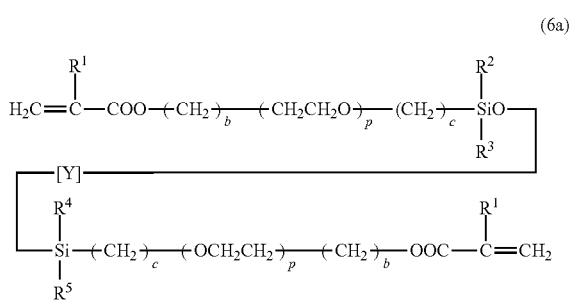

(6a)

wherein, $R^1$ is hydrogen or methyl group; each of $R^2$, $R^3$, $R^6$ and $R^5$ is hydrocarbon group with 1-12 carbon atoms or trimethylsiloxy group; Y consists of the structural units (I) and (II) shown below, ratio of the structural unit (I) and the structural unit (II) being 1:10-10:1 and total number of the structural units (I) and (II) being 7-200; each of b and c is an integer of 1-20, being the same or different from each other; p is an integer of 0-20.

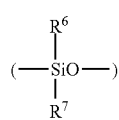

(I)

-continued

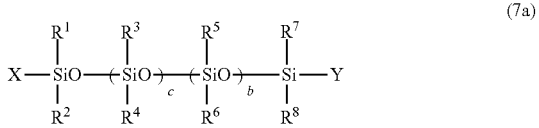

(II)

wherein, each of $R^6$ and $R^7$ is a hydrocarbon group with 1-12 carbon atoms; and each of $R^8$ and $R^9$ is a hydrocarbon or fluorinated hydrocarbon group with 1-12 carbon atoms, and at least one of $R^8$ and $R^9$ being fluorinated hydrocarbon group.

(7a)

$$X-\underset{R^2}{\overset{R^1}{Si}}O-(\underset{R^4}{\overset{R^3}{Si}}O)_c-(\underset{R^6}{\overset{R^5}{Si}}O)_b-\underset{R^8}{\overset{R^7}{Si}}-Y$$

wherein, X is substituent with radically polymerizable unsaturated group; Y is $R^9$ or X; c is 0-500; b is 1-500; each of $R^3$ and $R^6$ is a group selected from alkyl group, hydrocarbon group with 1-10 carbon atoms, halogenated alkyl group with 1-10 carbon atoms and trimethylsiloxy group, being the same or different from each other; $R^5$ is a fluorinated substituent linked with at least one hydroxyl group; each of $R^1$, $R^2$, $R^6$, $R^7$, $R^8$ and $R^9$ is a group selected from fluorinated substituent with at least one hydroxyl group, alkyl group with 1-10 carbon atoms, halogenated alkyl groups with 1-10 carbon atoms and trimethylsiloxy group, being the same or different from each other, and being the same to or different from $R^5$.

Among these, copolymers with siloxane methacrylates, fluoroalkylsiloxane methacrylates, fluoroalkyl methacrylates, fluoroalkylether methacrylates containing hydroxyl groups, hydrophilic monomers, crosslinkable monomers with two or more unsaturated groups in a molecule and polysiloxane monomers with polymerizable unsaturated groups at molecular ends are preferable because of well-balanced physical properties such as oxygen permeability, stain deposition and mechanical strength.

A contact lens comprising the above described polysiloxane monomer as a main component can be manufactured by conventional lens manufacturing methods such as the casting method in which a monomer composition is injected into a polymerization mold with a corresponding lens shape followed by a polymerization. A lens manufactured by using a polymerization mold made of a material with polar groups at a surface such as ethylene-vinylalcohol copolymer, polyamide and polyethylene terephthalate, is particularly preferable due to formation of a thick stable hydrophilic layer at a lens surface, little change in surface characteristics during extended-wearing, together with stable performances such as superior water wettability and reduced deposition of proteins and lipids.

The present invention includes the following.

(1) An ophthalmologic lens material obtained by copolymerization of at least one or more types of compounds of the following (a) and one or more types of compounds of the following (b).

(a) Hydrophilic Polysiloxane Monomers Shown by the Formula (1b):

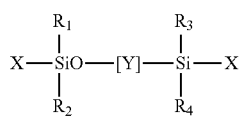
(1b)

wherein, X is a polymerizable substitution group shown by the formula (2b):

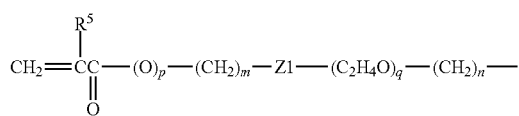
(2b)

wherein, $R^5$ is hydrogen or methyl group; Z1 is a linking group selected from —NHCOO—, —NHCONH—, —OOCNH—$R^6$—NHCOO—, —NHCONH—$R^7$—NHCONH— and —OOCNH—$R^8$—NHCONH— ($R^6$, $R^7$ and $R^8$ are hydrocarbon groups with 2-13 carbon atoms); m is 0-10; n is 3-10; p is 0 when m is 0 and 1 when m is not less than 1; q is an integer of 0-20;

each of $R^1$, $R^2$, $R^3$ and $R^4$ is a hydrocarbon group with 1-12 carbon atoms or trimethylsiloxy group; Y consists of linkage of the structural units [I] and [II] shown by the following formulas, ratio of the structural unit [I] and the structural unit [II] being [I]/[II]=0.1-200 and total number of the structural units [I] and [II] being 10-1000:

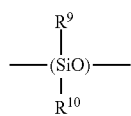
[I]

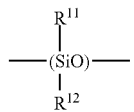
[II]

wherein, each of $R^9$ and $R^{10}$, being the same or different from each other, is a group selected from hydrocarbon group with 1-12 carbon atoms, fluorinated hydrocarbon group with 1-12 carbon atoms and trimethylsiloxy group; each of $R^{11}$ and $R^{12}$ consists of hydrocarbon group with 1-12 carbon atoms, trimethylsiloxy group or hydrophilic substituent, and at least one of $R^{11}$ and $R^{12}$ being hydrophilic substituent. A hydrophilic substituent in the present invention means a linear or cyclic hydrocarbon group linked with at least one substituent selected from hydroxyl group and oxyalkylene group.

(b) Amide-Group-Containing Monomers Having N-Vinyl Group (2) An ophthalmologic lens material described in (1) above, wherein the structural unit Y consists of a linkage of the structural units [I'], [II'] and [III'] shown by the following formulas:

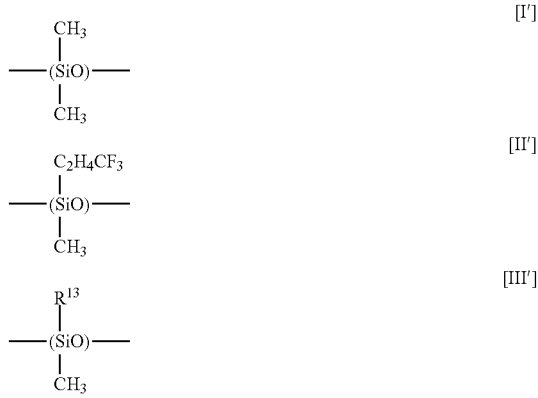

wherein, $R^{13}$ is a hydrophilic substituent which is linear or cyclic hydrocarbon group linked with at least one substituent selected from hydroxyl group and oxyalkylene group; linking ratio of the structural units [I'], [II'] and [III'] is ([I']+[II'])/[III']=0.5-100 and [II']/[I']=0-1 and total number of [I'], [II'] and [III'] is 10-1000.

(3) An ophthalmologic lens material described in (2) above, wherein the structure Y consists of a linkage of the structural units [I'], [II'] and [III'], linking ratio of structural units. [I'], [II'] and [III'] being ([I']+[II'])/[III']=1-50 and [II']/[I']=0.01-0.5, and total number of [I'], [II'] and [III'] being 20-500.

(4) An ophthalmologic lens material according to (1) above, wherein hydrophilic substituent of hydrophilic polysiloxane monomer is expressed by the formula (3b) or the formula (4b):

(3b)

wherein, $R^{14}$ is a hydrocarbon group with 3-12 carbon atoms and may have —O—, —CO— or —COO— group inserted between carbon atoms; number of hydroxyl group on the same carbon atom is limited to only one; a is larger than 1;

(4b)

wherein, $R^{15}$ is hydrocarbon group with 3-12 carbon atoms and may have —O—, —CO— or —COO— group inserted between carbon atoms; $R^{16}$ is hydrocarbon group with 2-4 carbon atoms and number of carbon atoms may be different from each other when b is not less than 2; b is 1-200; Z2 is a group selected from hydrogen, hydrocarbon group with 1-12 carbon atoms and —OOCR$^{17}$ (R$^{17}$ is hydrocarbon group with 1-12 carbon atoms).

(5) An ophthalmologic lens material described in (4) above, wherein hydrophilic substituent is selected from the formulas (5b), (6b) and (7b):

—C₃H₅OH  (5B)

—C₃H₆OCH₂CH(OH)CH₂OH  (6B)

C₃H₆OC₂H₄OH  (7B)

(6) An ophthalmologic lens material described in (4) above, wherein hydrophilic substituent is selected from the formulas (8b) and (9b):

—C₃H₆(OC₂H₄)$_c$OH  (8b)

—C₃H₆(OC₂H₄)$_d$OCH₃  (9b)

wherein, c and d are 2-40.

(7) An ophthalmologic lens material described in (1) above, wherein the amide-group-containing monomer having N-vinyl group is selected from N-vinyl formamide, N-vinyl acetamide, N-vinyl isopropylamide, N-vinyl-N-methyl acetamide, N-vinyl pyrrolidone and N-vinyl caprolactam.

(8) An ophthalmologic lens material described in (7) above, wherein the amide-group-containing monomer having N-vinyl group is N-methyl acetamide or N-vinyl pyrrolidone.

(9) An ophthalmologic lens material described in any of (1)-(8) above, consisting of a copolymer comprising at least 10-99% by weight of hydrophilic polysiloxane monomer and 1-90% by weight of amide-group-containing monomer having N-vinyl group.

(10) An ophthalmologic lens material described in (9) above, consisting of a copolymer comprising at least 30-95% by weight of hydrophilic polysiloxane monomer and 5-70% by weight of amide-group-containing monomer having N-vinyl group.

(11) An ophthalmologic lens material described in (1)-(10) above, consisting of a copolymer copolymerized further comprising a crosslinkable monomer linked with urethane group.

(12) An ophthalmologic lens material described in (11) above, prepared by copolymerization of monomers comprising a crosslinkable monomer shown by the formula (10b):

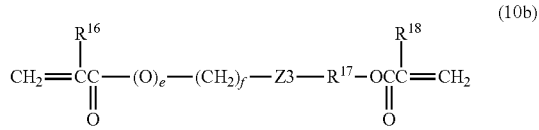

(10b)

wherein, each of $R^{16}$ and $R^{18}$, being the same or different from each other, is hydrogen or methyl group; Z3 is urethane linking group; $R^{17}$ is a group selected from hydrocarbon group with 2-10 carbon atoms and polyoxyethylene group shown by —(C₂H₄O)$_g$C₂H₄— (g is 2-40); f is 0-10; e is 0 when f is 0 and 1 when f is not less than 1.

(13) An ophthalmologic lens material described in (11) or (12) above, wherein a crosslinkable monomer is shown by the formula (11b):

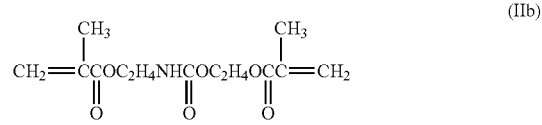

(IIb)

(14) A soft contact lens made of an ophthalmologic lens material described in any of (1)-(13) above.

(15) A method for manufacturing an ophthalmologic lens in a mold using an ophthalmologic lens material described in any of (1)-(14) above, characterized by that the said mold is made of a material with polar group.

(16) The method for manufacturing an ophthalmologic lens described in (15) above, characterized by that the mold material is insoluble to a composition of polymerizable monomers and at least one side of the mold for forming lens surface has contact angle to water not higher than 90°

(17) The method for manufacturing an ophthalmologic lens described in (15) or (16) above, wherein the mold material is a resin selected from polyamide, polyethylene terephthalate and ethylene-vinyl alcohol copolymer.

(18) The method for manufacturing an ophthalmologic lens described in (17) above, wherein the mold material is ethylene-vinylalcohol copolymer.

(19) The method for manufacturing an ophthalmologic lens described in any of (15)-(18) above, characterized by a polymerization by means of an irradiation of UV ray or visible light.

(20) The method for manufacturing an ophthalmologic lens described in any of (15)-(19) above, wherein the ophthalmologic lens is a soft contact lens.

In this specification, the structure units of [I'] and [II] of hydrophilic polysiloxane monomers are expressed as a block type linkage, but the present invention also includes a random linkage type. A hydrophilic substituent in the said polysiloxane monomers is a linear or cyclic hydrocarbon group linked with at least one substituent selected from hydroxyl group and oxyalkylene group, and preferably such group as shown by the following formula (3b) or (4b):

—R$^{14}$(OH)$_a$  (3b)

wherein, $R^{14}$ is hydrocarbon group with 3-12 carbon atoms and may have —O—, —CO— or —COO— group inserted between carbon atoms; number of hydroxyl group on the same carbon atom is limited to only one; a is not less than 1;

—R$^{15}$—(OR$^{16}$)$_b$—OZ2  (4b)

wherein, $R^{15}$ is hydrocarbon group with 3-12 carbon atoms and may have —O—, —CO— or —COO— group inserted between carbon atoms; $R^{16}$ is hydrocarbon group with 2-4 carbon atoms and number of carbon atoms may be different each other when b is not less than 2; b is 1-200; z2 is a group selected from hydrogen, hydrocarbon group with 1-12 carbon atoms and —OOCR$^{17}$ (R$^{17}$ is hydrocarbon group with 1-12 carbon atoms).

Preferable hydrophilic group includes: monohydric alcohol substituent such as —C₃H₆OH, —C₈H₁₆OH, —C₃H₆OC₂H₄OH, —C₃H₆OCH₂CH(OH)CH₃, —C₂H₄COOC₂H₄OH and —C₂H₄COOCH₂CH(OH)C₂H₅; polyhydric alcohol substituent such as —C₃H₆OCH₂CH(OH)CH₂OH, —C₂H₄COOCH₂CH(OH)CH₂OH and —C₃H₆OCH₂C(CH₂OH)₃; and polyoxyalkylene substituent such as —C₃H₆(OC₂H₄)₄OH, —C₃H₆(OC₂H₄)₃₀OH, —C₃H₆(OC₂H₄)₁₀OCH₃ and —C₃H₆(OC₂H₄)₁₀—(OC₃H₆)₁₀OC₄H₉. Among these, particularly preferable groups are: alcohol substituent such as —C₃H₆OH, —C₃H₆OCH₂CH(OH)CH₂OH and —C₃H₆OC₂H₄OH; and polyoxyethylene substituent such as —C₃H₆(OC₂H₄)cOH and —C₃H₆(OC₂H₄)dOCH₃ (c and d are 2-40) from the viewpoints of superior hydrophilic property and oxygen permeability.

Fluorine-containing substituent provides staining resistance to the material, but an excess substitution impairs hydrophilic property. A hydrocarbon substituent with 1-12 carbon atoms linked with fluorine atoms is preferable including: 3,3,3-trifluoropropyl group, 1,1,2,2-tetrahydroperfluorooctyl group and 1,1,2,2-tetrahydroperfluorodecyl group. Among these, 3,3,3-trifluoropropyl group is most preferable in view of hydrophilic property and oxygen permeability. Besides the hydrophilic substituent and the fluorine-containing substituent, substituents linked to Si atom include hydrocarbon group with 1-12 carbon atoms or trimethylsiloxy group, being the same or different from each other. Preferable group is alkyl group with 1-3 carbon atoms, and methyl group is particularly preferable. A polysiloxane chain with small substituent such as methyl group is flexible and has good oxygen permeability.

Ratio of linking numbers of the siloxane structure unit [I] and the siloxane structure unit linked with hydrophilic substituent [II], [I]/[II], is 0.1-200. When the ratio of the siloxane structure unit [I] decreases, flexibility and oxygen permeability of the siloxane chain decreases, whereas reduced content of the hydrophilic substituent lowers hydrophilic property and deteriorates surface water wettability. Total number of the siloxane structure units [I] and [II] is preferably 10-1000, more preferably 20-500. Shorter polysiloxane chain lowers flexibility and oxygen permeability of the polymer. Too long siloxane chain is undesirable due to a remarkable increase in viscosity of a polysiloxane monomer itself, which leads to difficulties in manufacturing and handling of the monomer together with lower degree of polymerization.

It is preferable from the viewpoint of polymerization that polymerizable unsaturated groups are linked to the ends of siloxane chain and structure of the unsaturated group is acrylate or methacrylate group. As a linking group to Si atom, hydrocarbon group containing urethane or urea linkages is preferable, and may be linked to Si atom through oxyethylene group. Urethane or urea linkage is highly polar and enhances hydrophilic property and strength of the polymer. A structure having two groups of this linkage can be introduced by a reaction with diisocyanate compound, and a linking group between the isocyanate linkages is a hydrocarbon with 2-13 carbon atoms and may be linear, cyclic or aromatic types. Aliphatic hydrocarbon is more preferable due to superior light resistance. Diisocyanate compounds used include trimethylene diisocyanate, hexamethylene diisocyanate, cyclohexyl diisocyanate, isophorone diisocyanate, 4,4'-dicyclohexyl diisocyanate and 2,4-torylenediisocyanate and the like.

There are various synthesis methods for the hydrophilic polysiloxane monomers disclosed in the present invention. An example includes the following: A ring-opening polymerization of a mixture of cyclic siloxane with hydrosilane (Si—H), cyclic siloxane with hydrocarbon group and disiloxane with hydroxyalkyl groups at both ends, along with cyclic siloxane with fluorine-substituted hydrocarbon group in certain cases, is performed using an acidic catalyst such as sulfuric acid, trifluoromethanesulfonic acid and acidic clay to obtain hydrosilyl-group-containing polysiloxane compound having hydroxyl groups at both ends. In this case, siloxane compounds with various degree of polymerization and introduction ratios of fluorine-containing substituent and hydrosilyl group can be obtained by changing feed ratios of each cyclic siloxanes and disiloxane compounds.

Isocyanate substituted acrylates or isocyanate substituted methacrylates are then reacted with hydroxyl groups at the ends of polysiloxane to obtain hydrosilane-containing fluorinated siloxane compound with polymerizable unsaturated groups at both ends. Here, isocyanate-substituted methacrylates include such monomers as methacryloxyethylisocyanate and methacryloylisocyanate. Isocyanate compounds with acrylate or methacrylate group obtained by reacting hydroxyl-group-containing acrylate or methacrylate such as hydroxyethyl methacrylate and hydroxybutyl acrylate with various diisocyanate compounds are also utilized.

Then, hydrophilic polysiloxane monomers can be obtained by adding a hydrophilic compound with unsaturated hydrocarbon group to the hydrosilane using a transition metal catalyst such as chloroplatinic acid, utilizing so called hydrosilylation reaction. In the hydrosilylation reaction, it is known that a dehydrogenation reaction occurs as a side reaction if an active hydrogen compound such as hydroxyl group and carboxylic acid is present. Therefore, if these active hydrogen atoms are present in a hydrophilic compound to be introduced, the side reaction should be suppressed by protecting the active hydrogen atom in advance or adding buffer agents (refer to, for example, U.S. Pat. No. 3,907,851 and JP-B-62-195389).

Another rout of synthesis is the following method: After synthesis of hydrosilyl-group-containing polysiloxane compound having hydroxyl groups at both ends, hydrophilic compound is introduced by hydrosilylation in advance, then polymerizable groups are introduced to both ends of the siloxane by reacting with isocyanate-substituted methacrylate or the like.

In this case also, if active hydrogel, which is reactive to isocyanate, is present in the hydrophilic compound, side reaction with isocyanate must be prevented by introducing a protective group. Alternatively, silicate ester derivative such as dimethoxy silane or diethoxysilane compound instead of cyclic siloxane can be used as a starting raw material. Mixtures of two or more hydrophilic polysiloxane monomers thus obtained can also be used.

In a copolymer as a material for an ophthalmologic lens, in particular, as a material for a hydrogel soft contact lens of the present invention, a hydrophilic monomer is indispensable as a comonomer component in addition to the hydrophilic polysiloxane monomer. Preferably an amide monomer, an amide monomer containing N-vinyl group among them, is useful to obtain superior transparency, staining resistance and surface wettability. Although a reason for superiority of the amide monomer containing N-vinyl group is not clear, it is supposed that a microwisely phase-separated structure may be formed in the copolymerization with the hydrophilic polysiloxane monomer disclosed in the present invention due to remarkably different copolymerizability, molecular weight and polarity of these monomers resulting in providing stable staining resistance and hydrophilic property to lens surface while maintaining transparency.

An amide monomer containing N-vinyl group is selected from N-vinyl formamide, N-vinyl acetamide, N-vinyl isopropylamide, N-vinyl-N-methyl acetamide, N-vinyl pyrrolidone and N-vinyl caprolactam, and mixed use of two or more kinds of monomers may be possible. N-vinyl-N-methyl acetamide and N-vinyl pyrrolidone are, in particular, preferable.

As for a composition of copolymerization, a copolymer is preferably composed of 10-99% by weight of hydrophilic polysiloxane monomer and 1-90% by weight of amide monomer containing N-vinyl group, and more preferably composed of 30-95% by weight of hydrophilic polysiloxane monomer and 5-70% by weight of amide monomer containing N-vinyl group. Lower content of hydrophilic polysiloxane monomer reduces oxygen permeability and flexibility. An excess content of amide monomer containing N-vinyl group increases water content and lowers strength.

A material disclosed in the present invention also includes copolymers obtained by addition of monomers other than the hydrophilic polysiloxane monomer and the amide monomer containing N-vinyl group. Any monomer can be used in the present invention so long as it is copolymerizable, and hydrophilic monomers, among them, are useful for a hydrous material. It is because they have good compatibility with the hydrophilic polysiloxane monomer and also can further improve surface wettability of polymer and modify water content. They include, for example, monomers containing hydroxyl group such as 2-hydroxyethyl methacrylate, 2-hydroxypropyl methacrylate, 4-hydroxybutyl acrylate and glycerol methacrylate; monomers containing fluorine-substituted group such as 3-(1,1,2,2-tetrafluoroethoxy)-2-hydroxypropyl methacrylate; monomers containing carboxyl group such as methacrylic acid, acrylic acid and itaconic acid; monomers containing alkyl substituted amino group such as dimethylaminoethyl methacrylate and diethylaminoethyl methacrylate; acrylamide or methacrylamide monomers such as N,N'-dimethylacrylamide, N,N'-diethylacrylamide, N-methylacrylamide, methylenebisacrylamide and diacetoneacrylamide; monomers containing oxyalkylene group such as methoxypolyethylene glycol monomethacrylate and polypropylene glycol monomethacrylate; and the like.

Siloxanyl acrylates are also useful comonomers to adjust oxygen permeability. For example, they include tris(trimethylsiloxy)silylpropyl methacrylate, bis(trimethylsiloxy)methylsilylpropyl methacrylate and pentamethyldisiloxanyl methacrylate. Polymerizable polydimethylsiloxane substituted with methacrylate group and the like can also be used for the similar objective.

Other monomers, which can be utilized, include fluorinated monomers such as fluoroalkyl acrylates and fluoroalkyl methacrylates, for example, trifluoroethyl acrylate, tetrafluoroethyl acrylate, tetrafluoropropyl acrylate, pentafluoropropyl acrylate, hexafluorobutyl acrylate, hexafluoroisopropyl acrylate and methacrylates corresponding to these acrylates.

Furthermore, alkyl acrylate monomers and alkyl methacrylate monomers can also be used if necessary. They include, for example, methyl acrylate, ethyl acrylate, n-propyl acrylate, n-butyl acrylate, stearyl acrylate and methacrylates corresponding to these acrylates. In addition, monomers with high glass transition temperature (Tg) such as cyclohexyl methacrylate, tert-butyl methacrylate and isobornyl methacrylate can also be used to enhance mechanical properties.

Moreover, crosslinkable monomers other than hydrophilic polysiloxane monomers can be used to improve mechanical properties and stability and adjust water content. For example, they include ethylene glycol dimethacrylate, diethylene glycol dimethacrylate, triethylene glycol dimethacrylate, polyethylene glycol dimethacrylate, trimethylolpropane trimethacrylate, pentaerythritol tetramethacrylate, bisphenol A dimethacrylate, vinyl methacrylate; acrylates corresponding to these methacrylates; siloxane derivatives such as 1,3-bis(3-methacryloxypropyl)tetramethyldisiloxane and the like.

The inventor of the present invention found out that crosslinkable monomers linked with urethane group, in a polymerization composition disclosed in the present invention, were particularly superior in compatibility and hydrophilic property, together with improvement of mechanical properties. Bifunctional crosslinkable monomers shown by the formula (10b) are preferable:

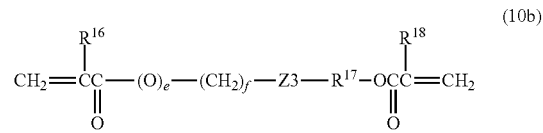

wherein, $R^{16}$ and $R^{18}$ are hydrogen or methyl group, being the same or different from each other; Z3 is urethane linking group; $R^{17}$ is selected from hydrocarbon group with 2-10 carbon atoms or polyoxyethylene group expressed by —$(C_2H_4O)_g C_2H_4$— (g is 2-40); f is 0-10; e is 0 when f is 0 and 1 when f is not less than 1.

Although reasons for a superiority of the above compounds as a crosslinkable monomer are not clear, it is considered that they have good compatibilities and copolymerizability and contribute to strength improvement by intermolecular interaction because the hydrophilic polysiloxane monomers disclosed in the present invention have a similar urethane group backbone. Examples of crosslinkable monomers of urethane linkage type are; 2-methacryloylcarbamoyloxyethyl methacrylate, 2-(2-methacryloxycarbamoyloxy)ethyl acrylate, 2-(2-methacryloxyethylcarbamoyloxy)propyl methacrylate, 2-methacryloxyethylcarbamoyloxytetraethylene glycol methacrylate and the like.

Particularly, crosslinkable monomers shown by the formula (11b) are preferable:

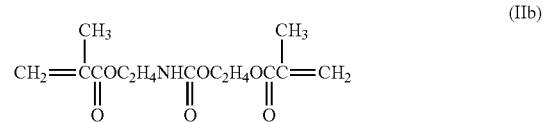

These crosslinkable monomers can be used alone or in combination of two or more kinds.

In order to improve a balance of characteristics of a hydrophilic material such as optical characteristics, oxygen permeability, mechanical strength, recovery from deformation, staining resistance in wearing, dimensional stability in tear and these durability, mixed monomers of these copolymerizable monomers can be used, various additives may further be added before or after polymerization, if necessary. Examples of additives include dyes or pigments with various coloring characteristics and UV absorbers. Furthermore, when a lens is manufactured using a mold, mold releasing agents such as surfactants can be added to improve separation of lens from the mold.

A polymer used for an ophthalmologic lens of the present invention is formed to an ophthalmologic lens by so called a mold method in which a monomer mixture comprising, for example, hydrophilic polysiloxane monomer and amide monomer containing N-vinyl group is filled into a mold, followed by a radical polymerization by the known method, or by so called a spin casting method in which a monomer mixture is fed in a rotatable hemisphere mold, followed by a polymerization. In these cases, polymerization of a solution of monomer mixture added with solvents in a mold is utilized to adjust degree of polymerization or lens swelling ratio. As the solvents to be added, those dissolving monomers well are used. Their examples include alcohols such as ethanol and isopropanol; ethers such as dimethylsulfoxide, dimethylformamide, dioxane and tetrahydrofuran; ketons such as methylethyl keton; esters such as ethyl acetate; and the like. Two or more of these solvents are also used in combination.

Any mold material can be used for mold polymerization or casting polymerization, so long as it is substantially insoluble to monomer mixture and lens can be separated after polymerization. For example, polyolefin resins such as polypropylene and polyethylene can be used, and materials having polar groups at a surface and small contact angle to water are preferable. Polar group here is an atomic group with strong affinity with water and includes hydroxyl group, nitrile group, carboxyl group, polyoxyethylene group, amide group, urethane group and the like. Preferable mold material is insoluble to a polymerization monomer composition and has contact angle to water at least at the part for forming one lens surface, not higher than 90°, preferably 65-80°, by the sessile drop method. A lens formed using a mold material having surface contact angle smaller than 80° shows particularly superior water wettability and stable performance in lipid deposition and the like. A mold material having surface contact angle smaller than 65° is not practical because it has a difficulty in lens separation from the mold material after polymerization, resulting in minute surface damages or fractures at an edge part of lens. A mold material soluble to monomer compositions is also difficult to use practically because it causes the separation problem of a lens, rough lens surface and low transparency. For example, acrylic or styrene-based resins such as methyl methacrylate copolymer and styrene copolymer can not be used because they are soluble to a composition comprising amide monomers disclosed by the present invention, although they have superior molding characteristics.

More preferably, a mold material is a resin selected from polyamide, polyethylene terephthalate and ethylene-vinylalcohol copolymer, and ethylene-vinylalcohol copolymer is particularly more preferable from the viewpoints of an easiness in molding itself providing a dimensionally stable mold and giving stable water wettability to lens. Ethylene-vinylalcohol copolymer resin to be used is available as "Soarlite" from The Japan Synthetic Chem. Ind. Co. Ltd. or "EVAL" from Kuraray Co., Ltd. Various grades with ethylene copolymerization ratio of about 25-50% by mole can be used in the present invention. In addition, polyethylene terephthalate with low crystallinity is difficult to be used as a mold material due to solubility problem for monomer compositions, but a grade with enhanced crystallinity can be used. For example, a drawn film of polyethylene terephthalate can be used by forming to a mold shape.

As a method for initiating polymerization in lens molding, a photopolymerization method to polymerize by UV or visible light irradiation in the presence of photopolymerization initiators in a monomer mixture, or a radical polymerization method to thermally polymerize using azo compounds or organic peroxides, may be used. Examples of photopolymerization initiator are benzoin ethyl ether, benzyl dimethyl ketal, α, α'-diethoxy acetophenone and 2,4,6-trimethylbenzoyl diphenyl phosphine oxide, examples of organic peroxide are benzoin peroxide and t-butyl peroxide, and examples of azo compound are azobisisobutyronitorile and azobisdimethylvaleronitorile. Among them, a photopolymerization method is preferable due to providing a stable polymerization in a short cycle time.

Surface of molded lens may be modified, if necessary, by applying plasma treatment, ozone treatment, graft polymerization or the like.

The present invention further includes the following compounds as a hydrophilic polysiloxane monomer shown by the formula (1).

(1) A bifunctional organosiloxane monomer shown by the following formula (1c):

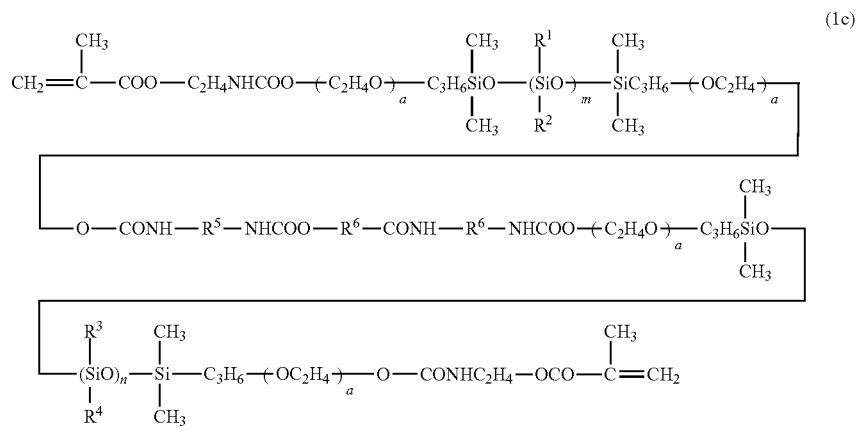

(1c)

wherein, each of $R^1$, $R^2$, $R^3$ and $R^4$ is a group selected from —$CH_3$ and —$CH_2CH_2CF_3$, being the same or different from each other; m+n is an integer of 7-1000;

$R^5$ is a group selected from hexamethylene group, tetramethylene group, dicyclohexylmethane group, hydrogenated tolylene group, hydrogenated xylylene group and isophorone group; a is an integer of 0-20; $R^6$ is a group selected from —$(C_2H_4O)_l$—, —$(CH_2C(CH_3)HO)_l$— and —$(C_4H_8O)_l$—, l being an integer of 1-40.

(2) A bifunctional organosiloxane monomer shown by the following formula (2c):

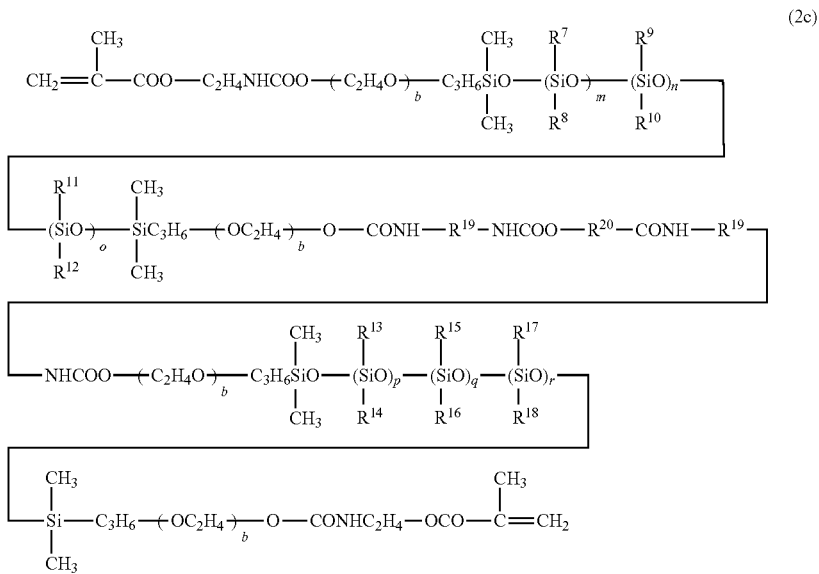

(2c)

wherein, each of $R^7$, $R^8$, $R^{11}$, $R^{12}$, $R^{13}$, $R^{14}$, $R^{17}$ and $R^{18}$ is a groups selected from —$CH_3$ and —$CH_2CH_2CF_3$, being the same or different from each other; m, o, p and r are integers of 5-500; b is an integer of 0-20;

each of $R^9$, $R^{10}$, $R^{15}$ and $R^{16}$ is a group selected from —$CH_3$ and —$(CH_2CH_2O)_sCH_3$, being the same or different from each other; n and q are integers of 1-500; s is an integer of 1-40;

$R^{19}$ is a group selected from hexamethylene group, tetramethylene group, dicyclohexylmethane group, hydrogenated tolylene group, hydrogenated xylylene group and isophorone group;

$R^{20}$ is a group selected from —$(C_2H_4O)_l$—, —$(CH_2C(CH_3)HO)_l$— and —$(C_4H_8O)_l$—; l is an integer of 1-40.

(3) A bifunctional organopolysiloxane monomer shown by the following formula (3c):

$R^{25}$ is a group selected from hexamethylene group, tetramethylene group, dicyclohexylmethane group, hydrogenated tolylene group, hydrogenated xylylene group and isophorone group;

$R^{26}$ is a group selected from —$(C_2H_4O)_l$—, —$(CH_2C(CH_3)HO)_l$— and —$(C_4H_8O)_l$—; l is an integer of 1-40;

$R^5$ group in the formula (1c), $R^{19}$ group in the formula (2c) and $R^{25}$ group in the formula (3c) are residual groups of bifunctional isocyanate and include, for example, hexamethylene diisocyanate, tetramethylene diisocyanate, 2,4,4-trimethyl-1,6-hexamethylene diisocyanate, methyl 2,6-diisocyanatecaproate, 3-isocyanatemethyl-3,5,5-trimethylcyclohexyl isocyanate, dicyclohexylmethane-4,4'-diisocyanate, hydrogenated xylene isocyanate, hydrogenated tolylene diisocyanate and isophorone diisocyanate. Among them, residual groups of hexamethylene diisocyanate and isophorone diisocyanate are preferable in view of well-balanced mechanical characteristics of a lens;

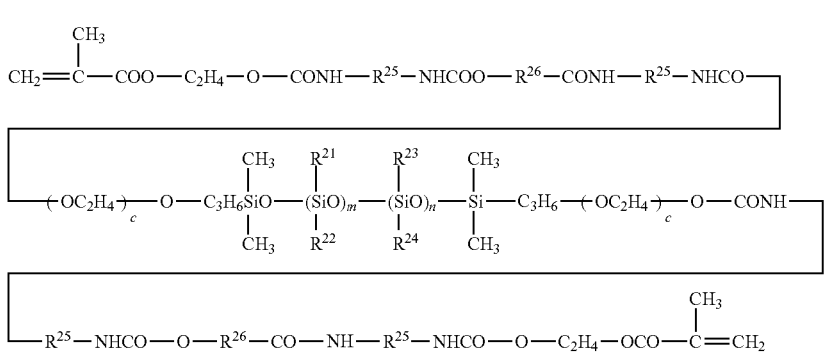

(3c)

wherein, each of $R^{21}$ and $R^{22}$ is a group selected from —$CH_3$ and —$CH_2CH_2CF_3$, at least one of them being —$CH_3$; m is an integer of 5-500; m+n is an integer of 7-1000; c is an integer of 0-20;

each of $R^{23}$ and $R^{24}$ is a group selected from —$CH_3$ and —$CH_2CH_2CF_3$, at least one of them being —$CH_2CH_2CF_3$; n is an integer of 0-500;

$R^6$, $R^{20}$ and $R^{26}$ groups are residual groups of polyoxyalkylene glycol and include groups such as polyethylene glycol, polypropylene glycol and polytetraethylene glycol, and those with polymerization degree of 1-40 can be used. Among them, polyethylene glycol is preferable due to providing superior water wettability of lens and staining resistance performance.

A bifunctional organopolysiloxane monomer shown by the formula (1c) and (2c) can be obtained, for example, by reacting two molar equivalent of a diol having polysiloxane structure obtained by a ring-opening insertion reaction among 1,3-bis-(hydroxyethoxypropyl)tetramethyldisiloxane, octamethylcyclotetrasiloxane and 1,3,5-trifluoropropyltrimethylcyclotrisiloxane, with an isocyanate-modified compound at both ends of polyethylene glycol obtained, for example, by a reaction of polyethylene glycol and two molar equivalent of hexamethylene diisocyanate, together with methacryloxyethyl isocyanate.

Furthermore, a bifunctional organopolysiloxane monomer shown by the formula (3c) can be obtained, for example, by reacting a diol having polysiloxane structure obtained, for example, by a ring-opening insertion reaction between 1,3-bis-(hydroxyethoxypropyl)tetramethyldisiloxane and octamethylcyclotetrasiloxane, together with, if necessary, 1,3,5-trifluoropropyltrimethylcyclotrisiloxane, with an excess amount of an isocyanate-modified compound at both ends of polyethylene glycol obtained, for example, by a reaction of two molar equivalent of hexamethylene diisocyanate, followed by reacting thus obtained product with an excess amount of 2-hydroxyethyl methacrylate.

An ophthalmologic lens material obtained by copolymerization of a hydrophilic polysiloxane monomer and an amide monomer containing N-vinyl group disclosed in the present invention is superior in transparency, water wettability, oxygen permeability and staining resistance. Although the material can be used for a hard lens such as a hard contact lens, it is useful for an application to a soft lens, in particular, a hydrogel soft contact lens. The material is, of course, also useful for an intraocular lens or a cornea lens. An ophthalmologic lens material disclosed by the present invention includes a hydrogel soft contact lens with contact angle in a range of 10-50° and 30-90° by the captive bubble method in water and by the sessile drop method in air, respectively, oxygen permeability of not less than 30 and water content of not less than 5%, and further a hydrogel soft contact lens with contact angle in a range of 10-40° and 30-80° by the captive bubble method in water and by the sessile drop method in air, respectively, oxygen permeability of not less than 80 and water content of not less than 9%. They provide a contact lens suitable for 30 days of continuous-wearing as described above.

Hereinbelow, the present invention will be further explained in detail using Examples, but the present invention should not be limited by these Examples.

Evaluation methods for lens characteristics in the Examples 1-7 and the Comparative Examples 1-3 are as follows.

(1) Water Content

A soft contact lens was immersed in purified water at 37° C. for 72 hours. After taking out and quick wiping off of surface water, the lens was weighed precisely. The lens was then dried at 80° C. in a vacuum dryer to a constant weight. Water content was calculated from a weight change as follows.

water content=(weight difference/weight before drying)×100(%)

(2) Oxygen Permeability (Dk Value)

Dk value was determined in physiological saline solution at 35° C. according to Standard Measurement Method for Dk Value by Japan Contact Lens Association, using an oxygen permeability measurement instrument for film, Model K-316-IPI manufactured by Rika Seiki Ind. Co., Ltd.

An expression of Dk value;×$10^{-11}$(cm$^2$/sec)·(ml O$_2$/ml×mmHg)

(3) Tensile Modulus

Test pieces of about 3 mm width were cut out from a central part of lens and tensile modulus (unit; dyne/cm$^2$) was determined from a initial slop of a stress-strain curve obtained by tensile test at the rate of 100 mm/min in physiological saline solution at 25° C., using Autograph (Model AGS-50B manufactured by Shimadzu Corp.).

(4) Protein Deposition

A model soiling solution with the following composition was prepared.

| | |
|---|---|
| NaCl | 0.9 weight % |
| NaH$_2$PO4 | 0.0184 weight % |
| Na$_2$HPO4 | 0.076 weight % |
| Egg lysozyme | 0.12 weight % |
| Bovine serum albumin | 0.388 weight % |
| CaCl$_2$(H$_2$O)$_2$ | 0.0407 weight % |

A lens was immersed in 2 ml of the solution at 37° C. for 24 hr, then washed by shaking in purified water for 30 min., followed by taking out and gentle wiping off of surface water.

The lens was then immersed in 2 ml of protein assay reagent (BCA liquid), followed by reacting at 40° C. for 5 hours, and absorption at UV 562 nm was measured using a spectrophotometer (Model V-550 manufactured by Japan Spectrophotometer Co., Ltd.)

An amount of protein adhered per lens was determined using a calibration line measured separately.

(5) Lipid Deposition

A lens was immersed in a phosphoric acid buffer dispersed solution containing 1% of olive oil and kept at 40° C. for 20 hours in a constant temperature oven. The lens was immersed in 5 ml of purified water in a container, then washed by shaking for 30 sec. Washing was repeated five times. After vacuum drying, the lens was extracted with a mixed solvents of chloroform/methanol: 2/1. The extract was then colored with triglyceride G reagent, and absorption at 505 nm was measured using a spectrophotometer (Model V-550 manufactured by Japan Spectrophotometer Co., Ltd.). An amount of lipid deposition per lens was determined using a calibration line measured separately.

(6) Water Wettability

Water wettability of a surface of soft contact lens was evaluated by measuring contact angle. Contact angle was measured by the captive bubble method in purified water using a contact angle tester (Model CA-DT manufactured by Kyowa Kaimen Kagaku Co., Ltd.). In addition, in order to evaluate water wettability in a dry state of a lens, measurement by the sessile drop method was also carried out. The measurements of contact angle by the captive bubble method and the sessile drop method were performed at 25° C. in accordance with Journal of Japan Contact Lens Society, 25 (1), 100, 1983. Smaller value and difference in both methods mean more superior water wettability, along with little change by drying of lens. On a recovered lens after wearing, water wettability was also evaluated by visual inspection on a state of water film maintained on a lens surface when it was pulled up from storage liquid. A case when wet state was maintained in whole surface for not less than 30 sec. was ranked as "superior", a case when wet state was lost even partly within one sec. was ranked as "poor", and a case when wet state was maintained for a time between them was ranked as "good".

(7) Wearing Test on a Rabbit Eye

Corneal curvature of a white rabbit was measured, and a lens with 13.5 mm of diameter, 0.05 mm of center thickness, −3.00 diopter of power and base curve larger than the measured curvature by about 0.2 mm was used for wearing test and observed for 21 days. A state of wearing was recorded and a cornea was inspected in every 7 days by visual inspection and fluorescence dying.

(8) Measurement of Vickers Hardness

A micro hardness tester for light loading (Model MVK-IS manufactured by Akashi Seisakusyo Co., Ltd.) was used. Test piece was polished to mirror finish, stored in a silica gel desiccator, then hardness was measured at 25° C.

Example 1

Synthesis of Hydrophilic Siloxanyl Methacrylate

A solution of 12.4 g of 2-isocyanatoethyl methacrylate in 30 ml of cyclohexane was prepared, then said solution was added dropwisely into a solution of 30 g of tris(trimethylsiloxy)silyl propyloxyethyl alcohol in 50 ml of cyclohexane added with 0.03 g of dibutyltin laurate, followed by reacting for 24 hours at 50° C. After finishing the reaction by confirming disappearance of isocyanate group by an infrared spectrum, the reaction mixture was stirred with adding water, and further stirred with adding 500 ml of n-hexane, then about 1000 ml of saturated aqueous NaCl solution. The organic layer was separated, and dried by adding magnesium sulfate. Removal of the solvent under a reduced pressure gave 32 g of hydrophilic siloxanyl methacrylate shown by the following formula II:

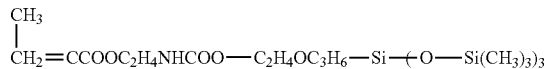

(II)

Preparation of Lens

A mixture of 9.5 parts by weight of thus obtained hydrophilic siloxanyl methacrylate, 23.5 parts by weight of tris(trimethylsiloxy)silylpropyl methacrylate, 30.5 parts by weight of N-vinylpyrrolidone, 23.5 parts by weight of N-dimethyl acrylamide, 7 parts by weight of trifluoroethyl methacrylate, 5 parts by weight of 1,1,2,2-tetrafluoroethoxy-2-hydroxypropyl methacrylate, 0.9 parts by weight of ethyleneglycol dimethacrylate and 0.1 parts by weight of azobisisobutylonitrile (hereinafter "AIBN") was dissolved and mixed under nitrogen atmosphere.

The mixture was poured into a test tube made of propylene with a diameter of 16 mm, and polymerized for 72 hours at 90° C. resulting in a transparent polymer with Vickers Hardness of 8.4.

From the polymer thus obtained, a lens with base curve: 9.0 mm, power: −3.00 diopter, diameter: 14.0 mm and thickness at center: 0.05 mm was prepared by a lathe-cutting and polishing method. By swelling the dry lens obtained with a physiological saline solution for 3 hours then with a soaking solution for 16 hours at 90° C. gave a hydrogel soft lens. The lens obtained showed, after dipping in purified water for 72 hours at 37° C., 46% of water content and $1.0 \times 10^7$ dyne/cm$^2$ of tensile modulus. Depositions of proteins and lipids to the lens were evaluated by dipping the lens in a model soiling solution proving less deposition such as 10 µg/lens for protein and 40 µg lens for lipid. In addition, oxygen permeability (Dk value) measured with a disk having a given thickness was 60, and water wettability was 22° by the captive bubble method and 60° by the sessile drop method.

The lenses described above were worn on eyes of a white rabbit for continuous 21 days, and showed a smooth movement without adhesion and little deposition on the lenses. In addition, it was proved that the lenses were safe enough for an extended-wearing without showing any problem on the eyes of the rabbit. The recovered lenses maintained the superior water wettability, and did not show any change during use in the lens performances.

Example 2

A transparent polymer was obtained by polymerizing according to the same method as described in the Example 1 except for using 18 parts by weight of hydrophilic siloxanyl methacrylate and 15 parts by weight of tris(tri-methylsiloxy)silylpropyl methacrylate. From the polymer thus obtained, hydrogel soft lenses having 44% of water content and $1.2 \times 10^7$ dyne/cm$^2$ of tensile modulus were prepared. Furthermore, depositions of proteins and lipids were so little as 5 µq/lens and 38 µg/lens, respectively, and Dk value was 60. Water wettability was 20° by the captive bubble method and 56° by the sessile drop method.

Example 3

As a hydrophilic siloxanyl methacrylate, a monomer having a fluorosiloxanyl alkyl group shown by the formula (2a) was synthesized similarly to the synthesis method in the Example 1. The monomer obtained was polymerized similarly to the method in the Example 1 resulting in a polymer, from which lenses were prepared similarly to the method in the Example 1. Water content and tensile modulus were 40% and $1 \times 10^7$ dyne/cm$^2$, respectively. In addition, depositions of proteins and lipids were so little as 12 µg/lens and 35 µg/lens, respectively, and Dk value was 65. Water wettability was 20° by the captive bubble method and 57° by the sessile drop method.

Example 4

As a hydrophilic siloxanyl methacrylate, a monomer having a siloxanyl alkyl group (l=10) shown by the formula (3a) was synthesized similarly to the synthesis method in the Example 1. The monomer obtained was polymerized similarly to the method in the Example 1 resulting in a polymer, from which lenses were prepared similarly to the method in the Example 1. Water content and tensile modulus were 40% and $0.9 \times 10^7$ dyne/cm$^2$, respectively. In addition, depositions of proteins and lipids were so little as 15 µg/lens and 45 µg/lens, respectively, and Dk value was 68. Water wettability was 24° by the captive bubble method and 63° by the sessile drop method.

Example 5

A mixture of 15 parts by weight of hydrophilic siloxanyl methacrylate, 25 parts by weight of tris(trimethylsiloxy)silylpropyl methacrylate, 27 parts by weight of N-vinylpyrrolidone, 20 parts by weight of N-dimethylacrylamide, 7 parts by weight of trifluoroethyl methacrylate, 5 parts by weight of 1,1,2,2-tetrafluoroethoxy-2-hydroxypropyl methacrylate, 0.9 parts by weight of ethyleneglycol dimethacrylate and 0.1 parts by weight of AIBN was polymerized similarly as in the Example 1 giving a transparent polymer having a Vicker Hardness of 7.5.

From the polymer obtained, lenses were prepared by the lathe-cutting and polishing method so that they had base curve of 8.5 mm, power of −3.00 diopter, size of 14.0 mm and center thickness of 0.05 mm. The dry lenses obtained were swelled in a physiological saline solution for 3 hours then in a soaking solution for 16 hours at 90° C. to give hydrous soft lenses. Water content and tensile modulus of the lenses obtained after dipping in purified water for 72 hours at 37° C. were 30% and $1.1 \times 10^7$ dyne/cm², respectively. Depositions of proteins and lipids to the lens were evaluated by dipping the lens in a model staining solution proving less deposition such as 12 μg/lens for proteins and 35 μg/lens for lipids. In addition, oxygen permeation coefficient (Dk value) measured with a disk having a given thickness was 75, and water wettability was 22° by the air bubble method and 60° by the droplet method.

The lenses described above were worn on eyes of a white rabbit for continuous 21 days, and showed a smooth movement without adhesion and little deposition on the lenses. In addition, it was proved that the lenses were safe enough for an extended-wearing without showing any problem on the eyes of the rabbit. The recovered lenses showed good water wettability, and did not show any change during use.

Example 6

The mixture of the monomers used in the Example 1 except for changing AIBN to 2,4,6-trimethylbenzoyl diphenylphosphine oxide (hereinafter "TPO") was poured into a lens-shaped mold made of ethylene-vinylalcohol copolymer for casting polymerization, then polymerized by an irradiation of UV ray followed by hydration to give soft contact lenses. Evaluations of physical properties of the lens carried out similarly to the Example 1 gave water content of 46% and Dk value of 60 both of which were same as in the Example 1, and proved that depositions of proteins and lipids were so little as 18 μg/lens and 150 μg/lens, respectively. Water wettability was 22° by the captive bubble method and 54° by the sessile drop method showing no decrease of water wettability of a surface by drying. An extended-wearing test with rabbit eyes showed less depositions and no deformation. Also water wettability was kept in a superior state without any change during use, and the water film on a surface did not disappear when the lens was taken out from the soaking solution.

Comparative Example 1

A polymerization was carried out according to the method described in the Example 1 except for using no hydrophilic siloxanyl methacrylate and 33 parts by weight of tris(trimethylsiloxy)silylpropyl methacrylate. Button-like test pieces were prepared from the polymer thus obtained. An inspection of distortion showed a slight optical distortion. Hydrogel soft lenses were prepared as in the Example 1. Results of the evaluation on their physical properties showed water content of 45% and Dk value of 45 both of which were similar to the results in the Example 1, but more depositions of proteins and lipids which were 20 μg/lens and 255 μg/lens, respectively. Water wettability was 21° by the captive bubble method and 110° by the sessile drop method, and it became worse by drying with a remarkable change in a contact angle.

A long-wearing test with rabbit eyes showed more deposition and a partial deformation of the lens. Recovered lenses showed poor water wettability, and showed a state in which the lens lost water film on its surface immediately when it was taken out from the soaking solution.

Comparative Example 2

The mixture of the monomers described in the Example 6 was poured into a lens-shaped mold for casting polymerization made of polypropylene, then polymerized by an irradiation of UV ray followed by swelling to give soft contact lenses. Evaluations of physical properties of the lenses carried out similarly to the Example 1 gave water content of 46% and Dk value of 60 both of which were same as in the Example 6, but showed more depositions of proteins and lipids which were 45 μg/lens and 450 μg/lens, respectively. Water wettability was 26° by the captive bubble method and 115° by the sessile drop method showing a remarkable difference between them, and water wettability of a surface decreased by drying. An extended-wearing test with rabbit eyes showed much deposition, a partial deformation of the lens. Water wettability also changed drastically, and the water film on a surface disappeared immediately when the lens was taken out from a soaking solution.

Example 7

A hydrophilic polysiloxane monomer shown by the formula (8a) was synthesized by a reaction of corresponding dihydroxypropyl polysiloxane and 2-isocyanatoethyl methacrylate.

A mixture of monomers comprising 70 parts by weight of the hydrophilic polysiloxane monomer described above, 15 parts by weight of N-vinylpyrrolidone, 15 parts by weight of N,N-dimethylacrylamide, 5 parts by weight of trifluoroethyl methacrylate, 1 part by weight of ethyleneglycol dimethacrylate and 0.5 parts by weight of TPO was poured into a lens-shaped mold for casting polymerization made of ethylene-vinylalcohol copolymer, then polymerized by an irradiation of UV ray followed by hydration to give soft contact lenses. Evaluations of physical properties of the lenses carried out similarly to the Example 1 gave water content of 23% and Dk value of 160, and little depositions of proteins and lipids which were 18 μg/lens and 50 μg/lens, respectively. Water wettability was 21° by the captive bubble method and 54° by the sessile drop method showing no decrease of water wettability of a surface by drying.

An extended-wearing test with rabbit eyes showed little depositions and no deformation. Water wettability was also maintained in a superior state without any change during use, and a water film on a surface did not disappear for 60 seconds when the lens was taken out from a soaking solution.

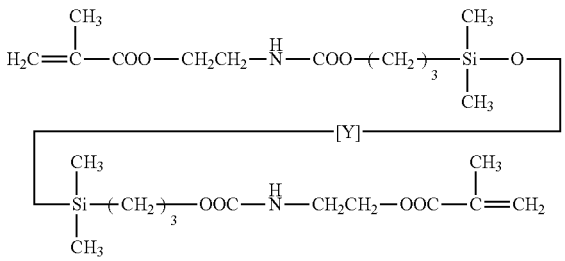

(8a)

wherein,

Y:

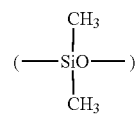

(I)

-continued

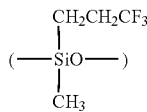

Number of (I): about 65 Number of (II): about 46 (I)/(II)= 1.41

Comparative Example 3

The mixture of the monomers in the Example 7 was poured into a lens-shaped mold for casting polymerization made of polypropylene, then polymerized by an irradiation of UV ray followed by hydration to give soft contact lenses. Evaluations of physical properties of the lens carried out similarly to the Example 7 gave water content of 24% and Dk value of 165, and showed much adhesions of proteins and lipids which were 60 μg/lens and 350 μg/lens, respectively. Water wettability was 26° by the captive bubble method and 120° by the sessile drop method, and showed a remarkable decrease of water wettability of a surface by drying.

An extended-wearing test with rabbit eyes resulted in that the lenses became cloudy due to much depositions and also were deformed. Water wettability varied during use and water screen of a surface disappeared immediately when they were taken out from a storage liquid.

The present invention will be further explained in more detail with the following Synthesis Examples, Examples 8-22 and Comparative Examples 4-14. However, the present invention is not limited by these Examples. Each evaluation item was measured as follows.

(1) Optical Transparency

Evaluation was performed by visual inspections and results were ranked as follows: finely transparent without cloudiness; ◯, translucent with cloudiness; Δ, opaque with cloudiness; x.

(2) Water Wettability

Wettability to the purified water was evaluated by visual inspections. Lenses were pulled up vertically after dipping in the purified water for one day, then water wettability was ranked by a time for which water film was maintained for: 5 seconds or more; ◯, 1-5 seconds; Δ, 1 second or less; x.

(3) Water Wettability in Dry State

A Lens was dipped in the purified water then taken out. After wiping off adhered water, the lens was left for 10 minutes at 25° C. After dipping in the purified water, the lens was pulled up vertically, then water wettability was evaluated and ranked by a time for which water film was maintained for: 5 seconds or more; ◯, 1-5 seconds; Δ, 1 second or less; x.

(4) Contact Angle

Contact angle of a water drop on a surface of mold material was measured using a contact angle measuring instrument (manufactured by Kyowa Kaimen Kagaku Co., Ltd., Model CA-DT) at 25° C. (by the sessile drop method in air).

(5) Water Content

Measurement was performed according to the method as described in the Example 1-7.

(6) Oxygen Permeability (Dk Value)

Measurement was performed by the electrode method using a Model K-316-IPI oxygen permeability measurement instrument for film manufactured by Rika Seiki Kogyo Co., Ltd. according to the Standard Dk Value Measuring Method of Japan Contact Lens Association. As the test pieces, lenses having diameter of 14 mm and thickness of about 0.1-0.5 mm were prepared using a mold to provide for the measurement. The measurement was performed in a physiological saline solution at 35° C. An oxygen permeability was obtained from a slope of a line of oxygen permeation amount versus sample thickness. Dk value was expressed by a unit of $\times 10^{-11}$ [(ml×cm)/(cm$^2$×sec×mmHg)].

(7) Tensile Strength

Measurement was performed using Autograph AGS-50B manufactured by Shimadzu Corp. in a physiological saline solution at 25° C. Strength at break was measured with a center part having a width of 3 mm cut out from a lens. A unit is (g/mm$^2$).

(8) Lipid Deposition

Measurement was performed according to the method as described in the Examples 1-7.

(9) Solubility

Solubility of a mold material to a mixture of monomers was evaluated by the following method. One drop of a mixture of monomers was dropped on a flat surface of various kinds of mold and sheet-like materials, and left for 1 hour at 25° C. After wiping off the mixture of monomers with a soft cloth, the wiped-off-surface was inspected and ranked as follows: no change at all; ◯, cloudy surface; Δ, corroded uneven surface; x.

Synthesis Example 1

Synthesis of Polysiloxanediol Having Hydrosilane Groups (A1)

A mixture of 150 g of octamethylcyclotetrasiloxane, 22.6 g of 1,3,5-trimethyltrifluoropropyl-cyclotrisiloxane, 17.4 g of 1,3,5,7-tetramethyl-cyclotetrasiloxane, 7.2 g of 1,3-bis(4-hydroxypropyl)tetramethyldisiloxane, 200 g of chloroform and 1.5 g of trifluoromethane sulfonic acid was stirred for 24 hours at 25° C., then washed repeatedly with purified water until a pH of the mixture became neutral. After water was separated, chloroform was distilled off under the reduced pressure. The residual liquid was dissolved in isopropanol, reprecipitated with methanol, followed by removal of volatile components under the vacuum from a separated liquid to give a transparent viscous liquid. The said liquid was the siloxanediol having hydrosilane groups (A1) expressed by the following formula with a yield of 98 g. Here, although the structural formula of the linking group Y is shown as a block structure composed of each siloxane unit, actually it contains random structures, and this formula shows only a ratio of each siloxane unit. This is also the same in the following Synthesis Examples.

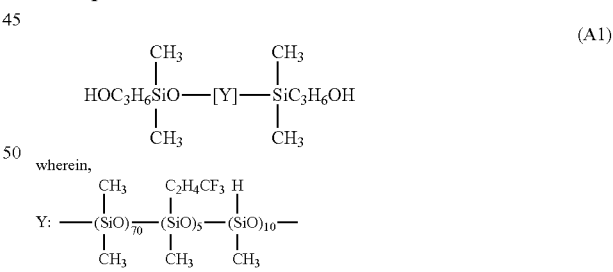

Synthesis of Polysiloxane-Dimethacrylate Having Hydrosilane Groups (B1)

A mixture of 50 g of the siloxanediol described above, 3.9 g of methacryloyloxyethyl isocyanate, 100 g of dry acetone and 0.02 g of dibutyltin dilaurate was poured in a brown-colored flask and stirred for 24 hours at 25° C., then further stirred after an addition of 1.4 g of purified water. Subsequently, acetone was distilled off under the reduced pressure, and the resulting liquid was washed with methanol followed by removal of volatile components under the vacuum again to give a transparent viscous liquid. The said liquid was the polysiloxane-dimethacrylate having hydrosilane groups (B1) expressed by the following formula with a yield of 48.7 g:

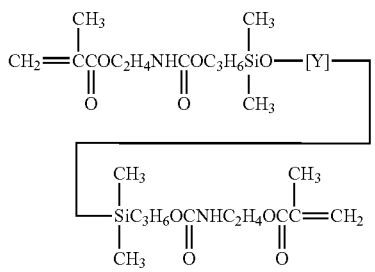
(B1)

wherein,
Y:

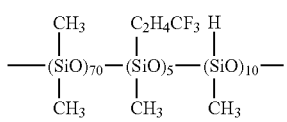

Synthesis of Polysiloxane-Dimethacrylate Having Alcohol Groups (C1)

A mixture of 48 g of the polysiloxane-dimethacrylate (B1) described above, 11.6 g of allyl alcohol, 96 g of isopropyl alcohol, 0.04 g of potassium acetate, 10 mg of chloroplatinic acid and 10 mg of di-t-butylcresol was charged into a flask with a reflux condenser and heated with stirring for 3 hours at 50° C. The reaction mixture was filtered, then isopropanol was distilled off under the reduced pressure, followed by washing with a mixture of methanol/water. Further removal of volatile components under the vacuum gave a transparent viscous liquid. The said liquid was the polysiloxane-di-methacrylate having alcohol groups (C1) shown by the following formula:

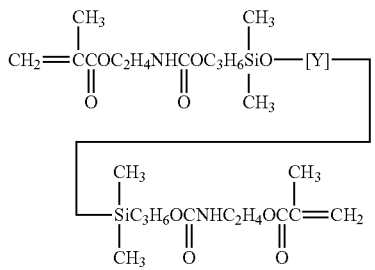
(C1)

wherein,
Y:

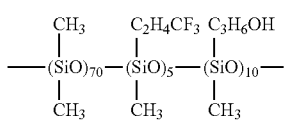

Synthesis Example 2

Synthesis of Polysiloxane-Dimethacrylate Having Alcohol Groups (C2)

A mixture of 35 g of the polysiloxane-dimethacrylate having hydrosilane groups (B1) described in the Synthesis Example 1, 15 g of 3-allyloxy-1,2-propanediol, 80 g of isopropyl alcohol, 0.03 g of potassium acetate, 6 mg of chloroplatinic acid and 7 mg of di-t-butylcresol was charged into a flask with a reflux condenser, and reacted and purified similarly as in the synthesis of (C1) in the Synthesis Example 1 to give 33 g of a transparent viscous liquid. The product was the polysiloxane-dimethacrylate having alcohol groups (C2) wherein the linking group Y in the formula (B1) in the Synthesis Example 1 was shown by the following formula:
Y:

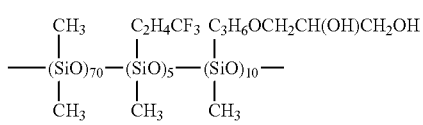
(C2)

Synthesis Example 3

Synthesis of Polysiloxane-Diol Having Hydrosilane Groups (A2)

A mixture of 190 g of octamethylcyclotetrasiloxane, 100 g of 1,3,5-trimethyltrifluoropropyl-cyclotrisiloxane, 7.7 g of 1,3,5,7-tetramethyl-cyclotetrasiloxane, 14.4 g of 1,3-bis(2-hydroxyethyloxypropyl)tetramethyl-disiloxane, 300 g of chloroform and 2.3 g of trifluoromethane sulfonic acid was charged into a flask, and synthesized and purified similarly to the siloxane-diol (A1) in the Synthesis Example 1 to give 110 g of a transparent viscous liquid. As a result of an analysis, the product was the polysiloxane-diol having hydrosilane groups (A2) shown by the following formula:

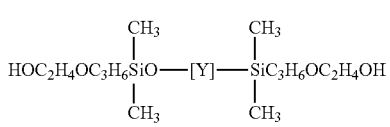
(A2)

wherein,
Y:

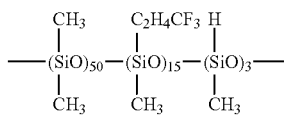

Synthesis of Polysiloxanediol Having Polyoxyethylene Groups (D1)

A mixture of 35 g of the polysiloxanediol having hydrosilane groups (A2) described above, 14 g of polyoxyethylene allylmethyl ether (molecular weight approximately 400), 100 g of isopropyl alcohol, 0.03 g of potassium acetate and 6 mg of chloroplatinic acid was charged into a flask with a reflux condenser and refluxed for 3 hours under the nitrogen atmosphere. The reaction mixture was filtered, then isopropanol was distilled off under the reduced pressure followed by washing with a mixture of methanol/water. Further removal of volatile components under the vacuum gave 42 g of a transparent viscous liquid. As a result of an analysis, the product was the polysiloxanediol having terminal methoxy type polyoxyethylene groups (D1) shown by the following formula:

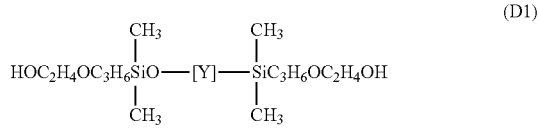
(D1)

wherein,
Y:

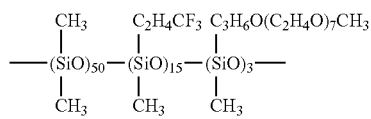

Synthesis of Polysiloxane-Dimethacrylate Having Polyoxyethylene Groups (C3)

A mixture of 40 g of the polysiloxanediol having polyoxyethylene groups (D1) obtained and 85 g of dry acetone was charged into a brown-colored flask and dissolved. The solution was then added with 2.0 g of methacryloxyethyl isocyanate, and stirred for 3 hours at 25° C. After adding 1.4 g of purified water, the solution was stirred for further 2 hours, followed by distilling off of acetone under the reduced pressure. The residual liquid was washed with a mixture of methanol/water followed by a removal of volatile components under the vacuum again to give 48.7 g of a transparent viscous liquid. As a result of an analysis, the product was the polysiloxane-dimethacrylate having terminal methoxy type polyoxyethylene groups (C3) as shown by the following formula:

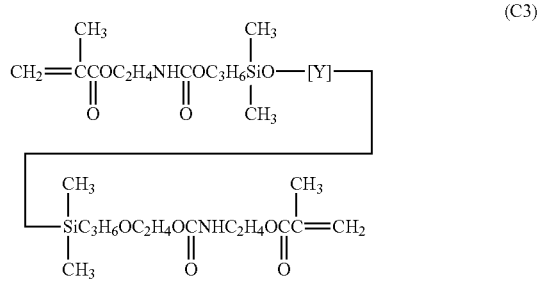
(C3)

wherein,
Y:

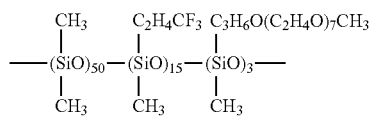

Synthesis Example 4

Synthesis of Polysiloxanediol Having Hydrosilan Groups (A3)

A mixture of 150 g of octamethylcyclotetrasiloxane, 12 g of 1,3,5,7-tetramethyl-cyclotetrasiloxane, 6.8 g of 1,3-bis(2-hydroxyethyloxypropyl)tetramethyl-disiloxane, 200 g of chloroform and 1.5 g of trifluoromethane sulfonic acid was charged into a flask, and synthesized and purified similarly to the siloxanediol (A1) in the Synthesis Example 1 to give 95 g of a transparent viscous liquid. As a result of an analysis, the product was the polysiloxanediol having hydrosilane groups (A3) shown by the following formula:

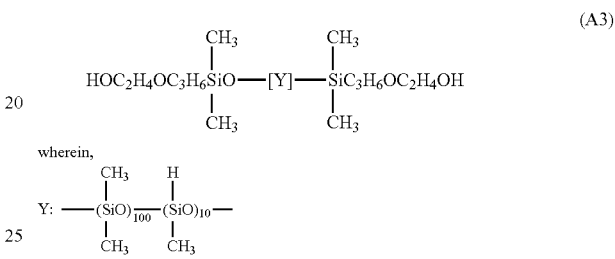
(A3)

wherein,
Y:

Synthesis of Polysiloxane-Dimethacrylate Having Hydrosilanes (B2)

A mixture of 50 g of the polysiloxanediol (A3) described above, 10 g of hexamethylene-diisocyanate, 100 g of dry acetone, 0.02 g of dibutyltin laurate and 2 mg of di-t-butyl-cresol was charged into a flask with a reflux condenser and refluxed for 2 hours under the nitrogen stream. The reaction mixture was added with 20 g of 2-hydroxyethyl methacrylate, then refluxed for further 2 hours. After adding 6 g of purified water, the mixture was left overnight at room temperature. Subsequently acetone was distilled off under the reduced pressure. Further removal of volatile components under the vacuum gave a transparent viscous liquid. The product was 36 g of polysiloxane-dimethacrylate having hydrosilane groups (B2) shown by the following formula:

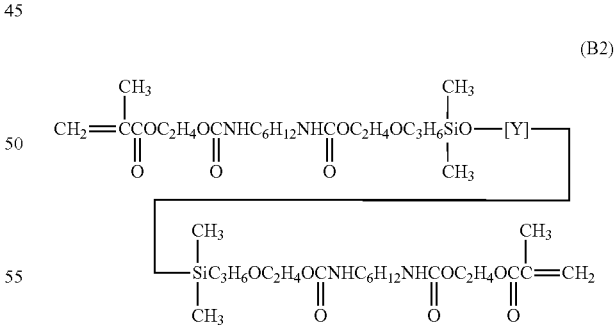
(B2)

wherein,
Y:

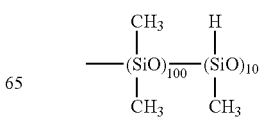

Synthesis of Polysiloxane-Dimethacrylate Having Alcohol Groups (C4)

A mixture of 30 g of the polysiloxane-dimethacrylate described above, 12 g of 2-allyloxyethanol, 60 g of isopropyl alcohol, 0.03 g of potassium acetate, 6 mg of chloroplatinic acid and 3 mg of di-t-butylcresol was charged into a flask with a reflux condenser and heated with stirring at 50° C. for 3 hours under the nitrogen atmosphere. The reaction mixture was filtered, then isopropanol was distilled off under the reduced pressure followed by washing with a mixture of methanol/water. Further removal of volatile components under the vacuum gave 24 g of a transparent viscous liquid. The product was the polysiloxane-dimethacrylate having alcohol groups (C4) with the linking group Y in the structural formula (B2) shown by the following formula:

Y:

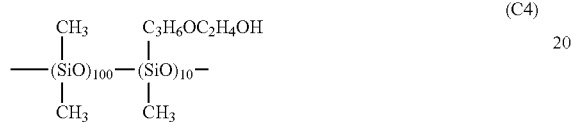

Synthesis Example 5

Synthesis of Polysiloxane-Dimethacrylate Having Hydrosilane Groups (B3)

A mixture of 50 g of the polysiloxanediol (A2) described in the Synthesis Example 3, 3.9 g of methacryloyloxyethylisocyanate, 100 g of dry acetone and 0.02 g of dibutyltin dilaurate was charged into a brown-colored flask and stirred at 25° C. for 24 hours under the nitrogen atmosphere. After adding 1.4 g of purified water, the mixture was stirred for further 3 hours. Acetone was distilled off under the reduced pressure, and the residual, liquid was washed with methanol. Removal of volatile components under the vacuum again gave a transparent viscous liquid. The product was 46 g of the polysiloxane-dimethacrylate having hydrosilane groups (B3) shown by the following formula:

Synthesis of Polysiloxane-Dimethacrylate Having Polyoxy-Ethylene Groups (C5)

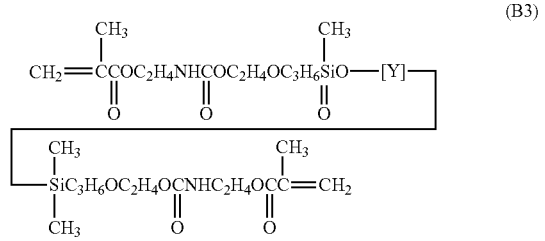

wherein,
Y:

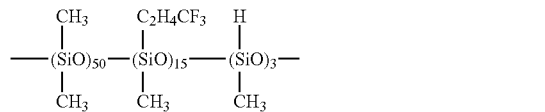

A mixture of 40 g of the polysiloxanediol having hydrosilane groups obtained, 20 g of polyoxyethylene allylether (molecular weight approximately 400), 80 g of isopropyl alcohol, 0.04 g of potassium acetate and 8 mg of chloroplatinic acid was charged into a flask with a reflux condenser and refluxed for 3 hours under the nitrogen atmosphere. The reaction mixture was filtered, then isopropanol was distilled off under the reduced pressure followed by washing with a mixture of methanol/water. Further removal of volatile components under the vacuum gave 42 g of a transparent viscous liquid. As a result of an analysis, the product was the polysiloxane-dimethacrylate having terminal
hydroxyl group type polyoxyethylene groups (C5), wherein the linking group Y in the structural formula (B3) was shown by the following formula:

Y:

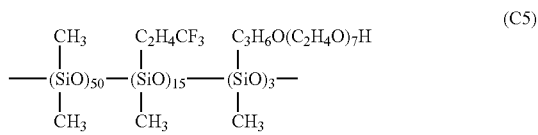

Synthesis Example 6

Synthesis of Polysiloxane-Dimethacrylate Having Polyoxyethylene Groups (C6)

A mixture of 40 g of the polysiloxanediol having hydrosilane groups (B3) obtained in the Synthesis Example 5, 40 g of polyoxyethylene allylmethylether (molecular weight approximately 1500), 120 g of isopropyl alcohol, 0.04 g of potassium acetate and 8 mg of chloroplatinic acid was charged into a flask with a reflux condenser and refluxed for 3 hours under the nitrogen atmosphere. The reaction mixture was filtered, then isopropanol was distilled off under the reduced pressure followed by washing with a mixture of methanol/water. Further removal of volatile components under the vacuum gave 38 g of a transparent viscous liquid. As a result of an analysis, the product was the polysiloxane-dimethacrylate having terminal methoxy type polyoxyethylene groups (C6), wherein the linking group Y in the structural formula (B3) was shown by the following formula:

Y:

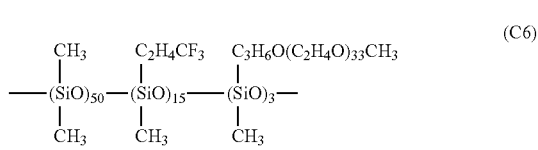

Synthesis Example 7

Synthesis of 2-(2-methacryloxyethylcarbamoyloxy)ethyl methacrylate

A mixture of 13 g of 2-hydroxyethyl methacrylate dried with desiccating agent, 15.6 g of methacryloxyethylisocyanate, 60 g of dry acetone was reacted similarly as in Synthesis Example 5 to give the compound shown by the formula (11a) (hereinafter "MIEM"):

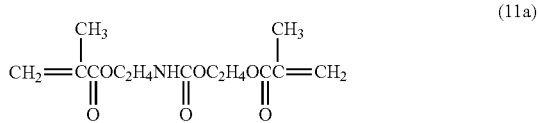

Example 8

A mixture of 80 parts by weight of polysiloxane-dimethacrylate having alcohol groups (C1) described in the Synthesis Example 1, 10 parts by weight of N-vinyl-N-methylacetamide (hereinafter "VMA"), 6 parts by weight of isobornyl methacrylate (hereinafter "IBM"), 4 parts by weight of tetraethyleneglycol dimethacrylate (hereinafter "4ED") and 0.5 parts by weight of 2,4,6-trimethylbenzoyl-diphenylphosphinoxide (hereinafter "TPO") was mixed with stirring. Then, the monomer mixture was injected into a mold for forming contact lens made of an ethylene vinyl alcohol resin (hereinafter "EVOH resin") (made by The Japan Synthetic Chem. Ind. Co., Ltd., Soarlite S), then irradiated by UV ray for 1 hour in a light exposure equipment to give a lens-shaped polymer. The lens thus obtained was dipped in ethyl alcohol overnight, then dipped in water followed by heating at 90° C. for 3 hours. The lens thus obtained was transparent and flexible, and showed good water wettability. Evaluation of physical properties showed water content of 10%, oxygen permeability (Dk) of 256, tensile strength of 185 g/mm$^2$ and lipid deposition of 40 μg. In addition, contact angle of the EVOH resin used to water was 73°. Results of evaluation on its performances are shown in Table 1.

Examples 9-13

Lenses were obtained using hydrophilic polysiloxane monomers described in the Synthesis Examples 2-6 by polymerizing and processing in the same manner in compositions and conditions as in the Example 8. Results of evaluation on its performances are described in Table 1.

Comparative Examples 4 and 5

Comparative lenses were prepared by polymerizing and processing in the same manner in compositions and conditions as in the Example 8, except for using the polydimethylsiloxane-dimethacrylate (R1) or the polysiloxane-dimethacrylate having alcohol groups (R2) shown by the following formulas instead of the hydrophilic polysiloxane monomer. Results obtained are shown jointly in Table 1.

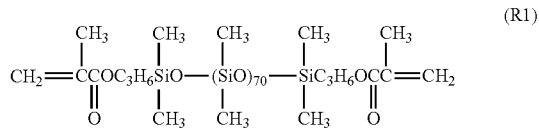

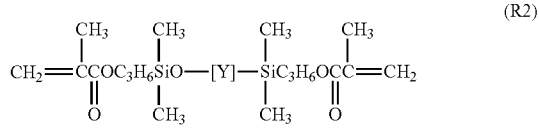

wherein,
Y:

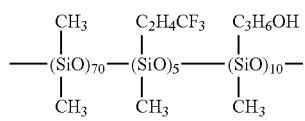

Example 14

A mixture of 60 parts by weight of polysiloxane-dimethacrylate having polyoxyethylene groups (C3), 35 parts by weight of N-vinylpyrrolidone (hereinafter "NVP"), 5 parts by weight of cyclohexyl methacrylate (hereinafter "CH"), 1 part by weight of ethyleneglycol-dimethacrylate (hereinafter "ED") and 0.5 parts by weight of TPO was mixed, photopolymerized in a mold made of EVOH resin in the same manner as in Example 8 to obtain a lens. Results of evaluation on the lens thus obtained are shown in Table 3.

Examples 15-18 and Comparative Examples 6-8

Monomer mixtures of the compositions shown in Table 2 were photopolymerized in the same manner as in Example 12 to obtain lenses. Results of evaluation are shown in Table 3.

Example 19

A lens was prepared in the exactly same manner as in Example 8 except for using the crosslinkable monomer ("MIEM") described in the Synthesis Example 5 instead of 4ED, and the lens obtained was evaluated. Results of the evaluation proved a transparent lens with good water wettability and improved strength, showing water content of 12%, oxygen permeability (Dk) of 245 and tensile strength of 285 g/mm$^2$

Example 20

A lens was prepared in the exactly same manner as in Example 10 except for using the crosslinkable monomer ("MIEN") described in the Synthesis Example 5 instead of 4ED, and the lens obtained was evaluated. Results of the evaluation showed water content of 23%, oxygen permeability (Dk) of 181 and improved tensile strength of 305 g/mm$^2$.

Examples 21-22 and Comparative Examples 9-14

A lens was prepared in the exactly same manner as in Example 8 except for using molds made of each resin shown in Table 4 instead of the mold for forming lens made of EVOH resin. Results of evaluation on solubility and contact angle of each resin material itself and on each lens are jointly shown in Table 4.

The present invention will be further explained with Examples 23-38 and Comparative Examples 15-19, but the present invention is not limited by these Examples. Furthermore, each evaluation item was measured as follows.
(1) Water content, (2) Oxygen permeability (Dk value) and (3) Water wettability (contact angle) were measured by the methods according to the Examples 1-7. (4) Rabbit eyes wearing test was carried out for 30 days by the method of the wearing test according to the Examples 1-7 with the same inspections.

Examples 23-26

The contact lens wearing tests described in the Examples 1, 5, 6 and 7 were performed again by extending the period to 30 days. All lenses showed good movements, little stain depositions, no abnormality on the rabbit eyes, and proved that they were safe enough for long period.

Example 27

Contact angle of the hydrogel contact lens obtained in the Example 8 was measured resulting in 18° by the captive bubble method and 57° by the sessile drop method. Furthermore, a rabbit eyes wearing test for 30 days also showed no lens adhesion and no abnormality on the house rabbit eyes.

Examples 28-33 and Comparative Examples 15-17

The contact lenses prepared in the Example 10, Examples 14-18 and Comparative Examples 6, 8 and 11 were evaluated by the rabbit wearing test similarly as in the Example 18. Results are shown in Table 5.

Example 34

Contact lenses were prepared using 100 pieces of molds made of EVOH resin in the same manner in monomer composition and procedures as described in Example 19. Defectives were only 2 pieces which were partly chipped at their edges, and no defect was observed in all of other 98 lenses, proving the present invention being very useful method for an industrial manufacturing.

Comparative Example 18

Using the same monomer composition as in the Example 44, a preparation of 100 pieces of lenses was tried with molds made of AS resin [acrylonitrile-styrene (40/60) copolymer]. None of good lens could be obtained with 35 pieces fractured to fragments, and the others having chippings at edges or damages on surfaces.

Comparative Example 19

In the same manner as in the Comparative Example 18, a preparation of 100 pieces of contact lenses was tried with molds made of AM resin (acrylonitrile-methyl acrylate copolymer, Barex-210 supplied by Mitsui Toatsu Chemicals Inc.). However, 90 pieces failed to keep lens shapes due to fractures to fragments in a mold separation, the other 10 pieces also had breaks or chippings in edges, and none of good lens could be obtained.

Example 35

A mixture of 50 parts by weight of the hydrophilic polysiloxane monomer shown by the following structural formula (4c), 20 parts by weight of tris(trimethylsiloxy)silylpropyl methacrylate, 25 parts by weight of VMA, 5 parts by weight of CH, 1 part by weight of ED, 0.5 parts by weight of TPO and 80 parts by weight of 2-butanol was stirred, then injected into a mold made of EVOH resin, followed by an irradiation of UV ray for 1 hour. The lens thus obtained was dipped in ethyl alcohol overnight. After the alcohol was replaced with water, the lens was heated at 90° C. for 3 hours. Evaluation on the hydrogel contact lens thus obtained showed water content of 32% and Dk value of 125. Contact angle was 24° by the captive bubble method and 77° by the sessile drop method. A house rabbit wearing test showed good lens movement, little deposition after 30 days wearing and good water wettability.

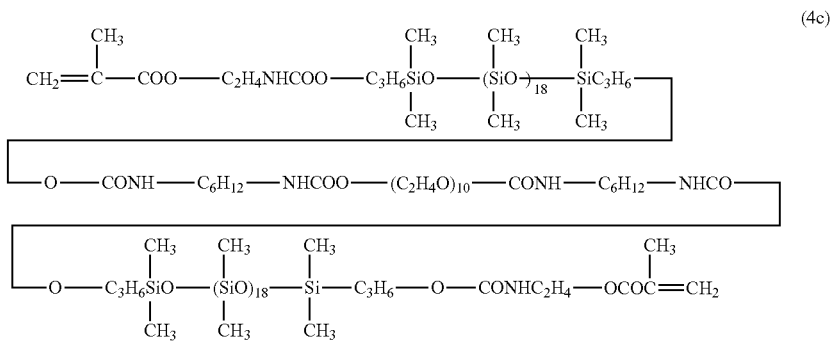

(4c)

Example 36

A mixture of 80 parts by weight of the hydrophilic polysiloxane monomer shown by the following structural formula (5c), 20 parts by weight of NVP, 1 part by weight of ED, 0.5 parts by weight of TPO and 80 parts by weight of 2-butanol was dissolved with stirring, and a contact lens was prepared similarly as in the Example 35. Evaluation on the lens showed water content of 13%, Dk value of 225, and contact angle of 24° by the captive bubble method and 70° by the sessile drop method. A house rabbit wearing test also showed good lens movement, little deposition, and maintaining of good water wettability.

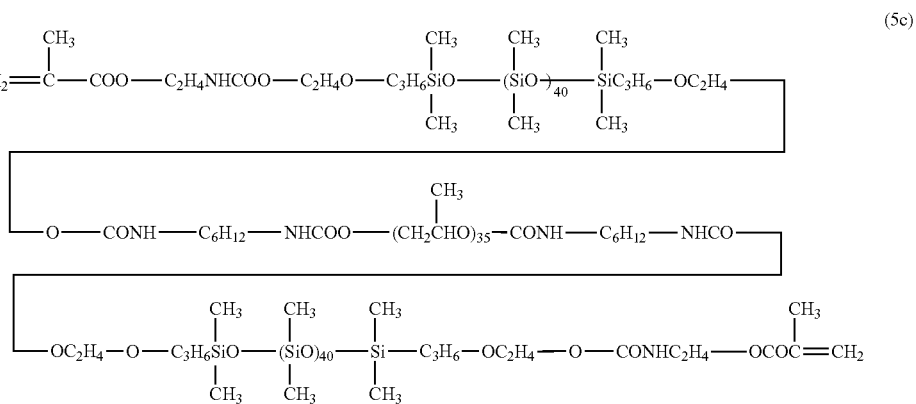

(5c)

Example 37

A contact lens was prepared in the same manner as in the Example 35 except for using the monomer shown by the following structural formula (6c) as a hydrophilic polysiloxane monomer. The lens thus obtained showed water content of 28%, Dk value of 166, and contact angle of 22° by the captive bubble method and 69° by the sessile drop method. A rabbit wearing test showed good lens movement, little deposition after 30 days wearing and good water wettability.

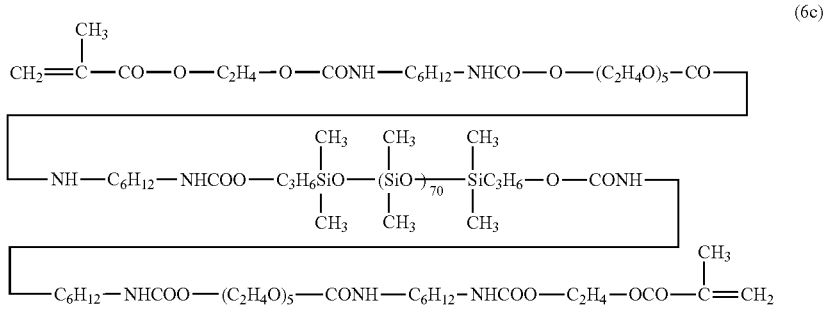

(6c)

Example 38

A contact lens was prepared in the same manner as in the Example 36 except for using the monomer shown by the following structural formula (7c) as a hydrophilic polysiloxane monomer. The lens thus obtained showed water content of 27%, Dk value of 285, and contact angle of 18° by the captive bubble method and 53° by the sessile drop method. A rabbit wearing test showed good lens movement, little deposition after 30 days wearing and maintaining of good water wettability.

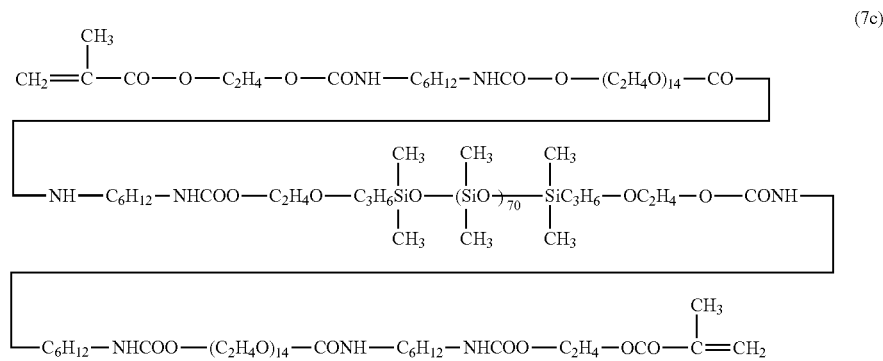

(7c)

TABLE 1

| Example No. | Polysiloxane Monomer (Synthesis Example No.) | Transparency | Water Wettability | Water Content (%) | Oxygen Permeability ($\times 10^{-11}$) | Tensile Strength (g/mm$^2$) | Lipid Deposition (µg) |
|---|---|---|---|---|---|---|---|
| Example 8 | C1 (Synthesis Example 1) | ○ | ○ | 10 | 256 | 185 | 40 |
| Example 9 | C2 (Synthesis Example 2) | ○ | ○ | 14 | 218 | 174 | 32 |
| Example 10 | C3 (Synthesis Example 3) | ○ | ○ | 22 | 186 | 210 | 35 |
| Example 11 | C4 (Synthesis Example 4) | ○ | ○ | 12 | 240 | 235 | 62 |
| Example 12 | C5 (Synthesis Example 5) | ○ | ○ | 20 | 183 | 207 | 35 |
| Example 13 | C6 (Synthesis Example 6) | ○ | ○ | 34 | 145 | 168 | 20 |

TABLE 1-continued

| Example No. | Polysiloxane Monomer (Synthesis Example No.) | Transparency | Water Wettability | Water Content (%) | Oxygen Permeability ($\times 10^{-11}$) | Tensile Strength (g/mm$^2$) | Lipid Deposition (μg) |
|---|---|---|---|---|---|---|---|
| Comparative Example 4 | R1 | Δ | X | 5 | 200 | 120 | 150 |
| Comparative Example 5 | R2 | ○ | Δ | 18 | 195 | 115 | 65 |

TABLE 2

(unit: parts by weight)

| Example No. | Polysiloxane (C3) | NVP | VMA | AC3 | MMA | DMA | HEMA | 3FM | OHF | CH | ED |
|---|---|---|---|---|---|---|---|---|---|---|---|
| Example 14 | 60 | 35 | | | | | | | | 5 | 1 |
| Example 15 | 50 | 15 | 15 | 20 | | | | | 5 | | 1 |
| Example 16 | 50 | 15 | | 20 | 15 | | | 5 | | | 1 |
| Example 17 | 60 | 35 | | | | | | | | 5 | 1 |
| Example 18 | 40 | | 20 | 20 | 10 | 10 | | 5 | | | 1 |
| Comparative Example 6 | 60 | | | | | | 35 | | | 5 | 1 |
| Comparative Example 7 | 60 | | | | 35 | | | | | 5 | 1 |
| Comparative Example 8 | 60 | | | | 20 | | 15 | | | 5 | 1 |

Abbreviations in the Table exhibit the following monomers.
NVP: N-Vinylpyrrolidone
VMA: N-Vinyl-N-methylacetoamide
AC3: 3-Tris(trimethylsiloxy)silylpropyl Methacrylate
MMA: Methyl Methacrylate
DMA: N,N-Dimethylacrylamide
HEMA: 2-Hydroxyethyl Methacrylate
3FM: 2,2,4-Trifluoroethyl Methacrylate
OHF: 1,1,2,2-Tetrafluoroethoxy-2-hydroxypropyl Methacrylate
CH: Cyclohexyl Methacrylate
ED: Ethyleneglycol-di-methacrylate

TABLE 3

| Example No. | Transparency | Water Wettability | Water Content (%) | Oxygen permeability ($\times 10^{-11}$) | Lipid deposition (μg) |
|---|---|---|---|---|---|
| Example 14 | ○ | ○ | 38 | 81 | 85 |
| Example 15 | ○ | ○ | 24 | 148 | 65 |
| Example 16 | ○ | ○ | 27 | 154 | 50 |
| Example 17 | ○ | ○ | 33 | 108 | 28 |
| Example 18 | ○ | ○ | 31 | 94 | 44 |
| Comparative Example 6 | ○ | X | 7 | 132 | 446 |
| Comparative Example 7 | Δ | Δ | 26 | 118 | 385 |
| Comparative Example 8 | ○ | ○ | 32 | 115 | 295 |

TABLE 4

| Example No. | Kind of Mold Resin | Resin Solubility | Contact Angle (°) | Transparency | Water Wettability | Water Wettability in Dry State |
|---|---|---|---|---|---|---|
| Example 8 | EVOH | ○ | 73 | ○ | ○ | ○ |
| Example 21 | PET | ○ | 75 | ○ | ○ | ○ |
| Example 22 | PA | ○ | 68 | ○ | ○ | Δ |
| Comparative Example 9 | AS | Δ | 77 | ○ | ○ | Δ |
| Comparative Example 10 | AM | Δ | 61 | ○ | ○ | Δ |
| Comparative Example 11 | PP | ○ | 110 | ○ | Δ | X |
| Comparative Example 12 | PS | X | 92 | Δ | X | X |
| Comparative Example 13 | PC | X | 76 | Δ | Δ | X |
| Comparative Example 14 | PMMA | X | 65 | Δ | Δ | X |

Abbreviations in the Table exhibit the following resins.
EVOH: Ethylene-Vinylalcohol Copolymer
PET: Polyethylene Terephthalate
PA: Nylon 66
AS: Acrylonitrile-Styrene (40/60) Copolymer
AM: Acrylonitrile-Methyl Methacrylate (75/25) Copolymer
PP: Polypropylene
PS: Polystyrene
PC: Polycarbonate
PMMA: Polymethylmethacrylate

TABLE 5

| Example No. | Lens Preparation Example | Contact Angle (°) Captive Bubble Method | Sessile Drop Method | Rabbit Wearing Test (30 days) Adhesion to Cornea | Stain Deposition | Water Wettability |
|---|---|---|---|---|---|---|
| Example 28 | Example 10 | 26 | 48 | no | little | superior |
| Example 29 | Example 14 | 23 | 63 | no | little | superior |
| Example 30 | Example 15 | 28 | 75 | no | little | superior |
| Example 31 | Example 16 | 28 | 77 | no | little | superior |
| Example 32 | Example 17 | 17 | 55 | no | little | superior |
| Example 33 | Example 18 | 23 | 66 | no | little | superior |
| Comparative Example 15 | Comparative Example 6 | 36 | 95 | occurred | much | poor |
| Comparative Example 16 | Comparative Example 8 | 27 | 98 | occurred | much | poor |
| Comparative Example 17 | Comparative Example 11 | 55 | 110 | occurred | much | poor |

INDUSTRIAL APPLICABILITY

The present invention provides a soft contact lens showing small and stable contact angle to water at its surface, little stain deposition in wearing, high oxygen permeability, no adhesion of the lens to cornea and superior extended-wearing characteristics. In addition, a ophthalmologic lens material obtained by a copolymerization of a hydrophilic siloxane monomer and a amide-group-containing monomer having N-vinyl group of the present invention shows superior transparency, water wettability, and in particular, superior resistance to lipid deposition. Furthermore, strength and durability are further improved by adding a crosslinkable monomer having urethane linking group. Moreover, polymerization in a mold comprising a resin having polar groups can give a stable water wettability to a lens. The material is useful particularly for a soft contact lens, and thus superior as a contact lens for extended-wearing.

What is claimed:

1. A molded silicone hydrogel contact lens having a surface contact angle in a range of 10-50 degrees by the captive bubble method in water, an oxygen permeability having a Dk value of about 60 or more, and a water content of at least 10% by weight, wherein the silicone hydrogel contact lens comprises units of monomers including a polysiloxane monomer, and an amide monomer containing an N-vinyl group.

2. The molded silicone hydrogel contact lens of claim 1, wherein the silicone hydrogel further comprises units of monomers including monomers containing a hydroxyl group, or methacrylamide monomers, or combinations thereof.

3. The molded silicone hydrogel contact lens of claim 2, wherein the silicone hydrogel comprises units of 2-hydroxyethyl methacrylate, units of N,N'-dimethylacrylamide, or combinations thereof.

4. The molded silicone hydrogel contact lens of claim 1, wherein the amide monomer containing an N-vinyl group comprises N-vinyl-N-methylacetamide, or N-vinylpyrrolidone.

5. The molded silicone hydrogel contact lens of claim 1, in which the surface contact angle as determined by the captive bubble method in water is 17-30 degrees.

6. The molded silicone hydrogel contact lens of claim 1, in which the water content is from 10% to about 46% by weight.

7. The molded silicone hydrogel contact lens of claim 1 which is obtained from a mold comprising a resin having a contact angle to water of no greater than 90 degrees by the sessile drop method.

8. The molded silicone hydrogel contact lens of claim 1, wherein the surface of the contact lens has not been modified by applying plasma treatment, ozone treatment, or graft polymerization.

9. The molded silicone hydrogel contact lens of claim 1, wherein the polysiloxane monomer is a monomer shown by formula (1)

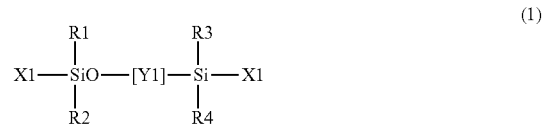

wherein, X1 is a polymerizable substituent shown by the following formula (2):

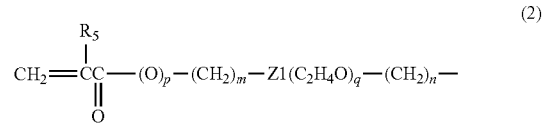

wherein, R5 is a hydrogen or a methyl group; Z1 is a linking group selected from —NHCOO—, —NHCONH—, —OCONH—R6-NHCOO—, —NHCONH—R7-NHCONH— and —OCONH—R8-NHCONH— (R6, R7 and R8 are hydrocarbon groups with 2-13 carbon atoms); m is 0-10; n is 3-10; p is 0 when m is 0 and 1 when m is not less than 1; q is an integer of 0-20; R1, R2, R3 and R4 are groups independently selected from hydrocarbon groups with 1-12 carbon atoms or trimethylsiloxy groups; and the structure [Y1] shows a polysiloxane backbone comprising not less than 2 sequential siloxane linkages.

10. The molded silicone hydrogel of claim 1, wherein the polysiloxane monomer is a monomer shown by formula (16)

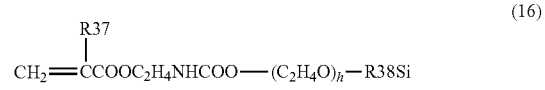

wherein R37 is hydrogen or a methyl group; R38Si is a siloxanyl group; and h is 0-20.

11. The molded silicone hydrogel contact lens of claim 1 which comprises a copolymer obtained from a composition comprising 10-99% by weight of the polysiloxane monomer and 1-90% by weight of an amide monomer.

12. The molded silicone hydrogel contact lens of claim 11, wherein the amide monomer is present in an amount from 25% by weight to 70% by weight.

13. The molded silicone hydrogel contact lens of claim 12, wherein the amide monomer is N-vinylpyrrolidone.

14. The molded silicone hydrogel contact lens of claim 1, wherein the surface contact angle is in a range of 30-90 degrees by the sessile drop method in air.

15. The molded silicone hydrogel contact lens of claim 1, wherein the amide monomer containing an N-vinyl group is hydrophilic.

16. The molded silicone hydrogel contact lens of claim 1, wherein the contact lens is manufactured by a polymerization in a mold, wherein a mold material is insoluble to a composition of polymerizable monomers and at least one side of the mold for forming a lens surface has a polar group.

17. The molded silicone hydrogel contact lens of claim 1, wherein the polysiloxane monomer is a hydrophilic polysiloxane monomer.

18. The molded silicone hydrogel contact lens of claim 1, wherein the water content is from 10% by weight to 60% by weight.

19. The molded silicone hydrogel contact lens of claim 1, wherein the water content is from 24% by weight to 60% by weight.

20. The molded silicone hydrogel contact lens of claim 1, wherein the amide monomer is N-vinylpyrrolidone.

* * * * *